(12) United States Patent
Kagaya et al.

(10) Patent No.: US 8,656,312 B2
(45) Date of Patent: Feb. 18, 2014

(54) CONTENT DISPLAY APPARATUS AND DISPLAY METHOD THEREOF

(75) Inventors: Naoto Kagaya, Yokohama (JP); Toru Kikuchi, Hino (JP)

(73) Assignee: Canon Kabushiki Kaisha, Tokyo (JP)

( * ) Notice: Subject to any disclaimer, the term of this patent is extended or adjusted under 35 U.S.C. 154(b) by 1025 days.

(21) Appl. No.: 12/199,239

(22) Filed: Aug. 27, 2008

(65) Prior Publication Data

US 2009/0070710 A1 Mar. 12, 2009

(30) Foreign Application Priority Data

Sep. 7, 2007 (JP) ................................. 2007-233376

(51) Int. Cl.
*G06F 3/0482* (2013.01)

(52) U.S. Cl.
USPC ........... 715/854; 715/713; 715/765; 715/766; 715/769

(58) Field of Classification Search
USPC .......................... 715/854, 713, 765, 766, 769
See application file for complete search history.

(56) References Cited

U.S. PATENT DOCUMENTS

| 6,314,426 | B1 * | 11/2001 | Martin et al. ........................... 1/1 |
| 2003/0001865 | A1 * | 1/2003 | Hirose et al. ................... 345/619 |
| 2004/0252119 | A1 | 12/2004 | Hunleth et al. ................ 345/440 |
| 2004/0252120 | A1 | 12/2004 | Hunleth et al. ................ 345/440 |
| 2004/0268393 | A1 | 12/2004 | Hunleth et al. .................. 725/44 |
| 2005/0005241 | A1 | 1/2005 | Hunleth et al. ................ 715/720 |
| 2007/0136286 | A1 | 6/2007 | Webster et al. .................... 707/7 |
| 2007/0255710 | A1 | 11/2007 | Kagaya ............................. 707/8 |
| 2008/0147664 | A1 | 6/2008 | Fujiwara et al. .................. 707/7 |

FOREIGN PATENT DOCUMENTS

| CN | 1722218 A | 1/2006 | |
| CN | 1784647 A | 6/2006 | |
| EP | 1035481 A1 * | 9/2000 | ............. G06F 17/30 |
| JP | 5-282123 | 10/1993 | |
| JP | 10-293675 | 11/1998 | |
| JP | 2000-067059 | 3/2000 | |
| JP | 2003-084881 | 3/2003 | |
| JP | 2005-020209 | 1/2005 | |
| JP | 2005-223632 | 8/2005 | |
| JP | 2006-191493 A | 7/2006 | |
| JP | 2006-285471 | 10/2006 | |
| JP | 2007-157145 A | 6/2007 | |
| WO | WO 9717661 * | 5/1997 | ............. G06F 17/30 |

* cited by examiner

*Primary Examiner* — Namitha Pillai
(74) *Attorney, Agent, or Firm* — Fitzpatrick, Cella, Harper & Scinto

(57) ABSTRACT

In a content display apparatus in which a plurality of contents are displayed according to the order of metadata added to each content, the plurality of contents are arranged hierarchically by metadata and a group of metadata, and an array of plurality of contents arranged hierarchically is formed. Icons representing contents are displayed on a display device according to the order of the array of plurality of contents formed, and when a command for scroll is made for the displayed icons, icons in the hierarchy level to which the icons belong are scroll displayed. The scroll speed for scroll displaying the icons is changed, and based on the changed scroll speed, the hierarchy level is changed so that icons in different hierarchy level are displayed and scrolled.

9 Claims, 31 Drawing Sheets

| CONTENTS | METADATA | METADATA GROUP |
|---|---|---|
| 411 | SOCCER | SPORTS |
| 412 | SOCCER | SPORTS |
| ... | ... | ... |
| 418 | SOCCER | SPORTS |
| 419 | SOCCER | SPORTS |
| 421 | GOLF | SPORTS |
| 422 | GOLF | SPORTS |
| ... | ... | ... |
| 426 | GOLF | SPORTS |
| 427 | GOLF | SPORTS |
| 431 | HIKING | TRAVELING |
| 432 | HIKING | TRAVELING |
| ... | ... | ... |
| 437 | HIKING | TRAVELING |
| 438 | HIKING | TRAVELING |
| 441 | CAMPING | TRAVELING |
| 442 | CAMPING | TRAVELING |
| ... | ... | ... |
| 444 | CAMPING | TRAVELING |
| 445 | CAMPING | TRAVELING |
| ... | ... | ... |

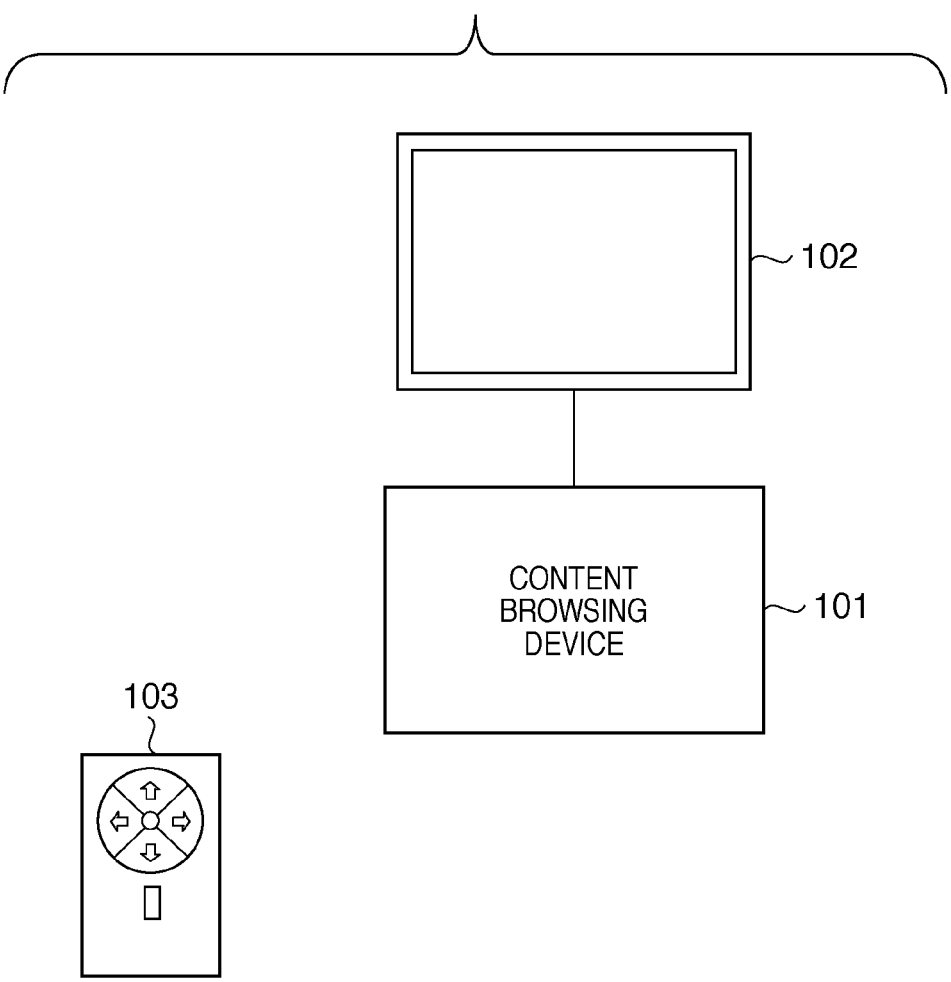
F I G. 1

| CONTENTS | METADATA | METADATA GROUP |
|---|---|---|
| 411 | SOCCER | SPORTS |
| 412 | SOCCER | SPORTS |
| ... | ... | ... |
| 418 | SOCCER | SPORTS |
| 419 | SOCCER | SPORTS |
| 421 | GOLF | SPORTS |
| 422 | GOLF | SPORTS |
| ... | ... | ... |
| 426 | GOLF | SPORTS |
| 427 | GOLF | SPORTS |
| 431 | HIKING | TRAVELING |
| 432 | HIKING | TRAVELING |
| ... | ... | ... |
| 437 | HIKING | TRAVELING |
| 438 | HIKING | TRAVELING |
| 441 | CAMPING | TRAVELING |
| 442 | CAMPING | TRAVELING |
| ... | ... | ... |
| 444 | CAMPING | TRAVELING |
| 445 | CAMPING | TRAVELING |
| ... | ... | ... |

FIG. 7

| ITEM | TIME |
|---|---|
| SWITCH-TO-FAST 1 | 500ms |
| SWITCH-TO-FAST 2 | 200ms |
| SWITCH-TO-FAST 3 | 100ms |
| ... | ... |
| SWITCH-TO-SLOW 1 | 1000ms |
| SWITCH-TO-SLOW 2 | 700ms |
| SWITCH-TO-SLOW 3 | 500ms |
| ... | ... |
| SWITCH-TO-STOP 1 | 1000ms |
| SWITCH-TO-STOP 2 | 1500ms |
| SWITCH-TO-STOP 3 | 2000ms |
| ... | ... |

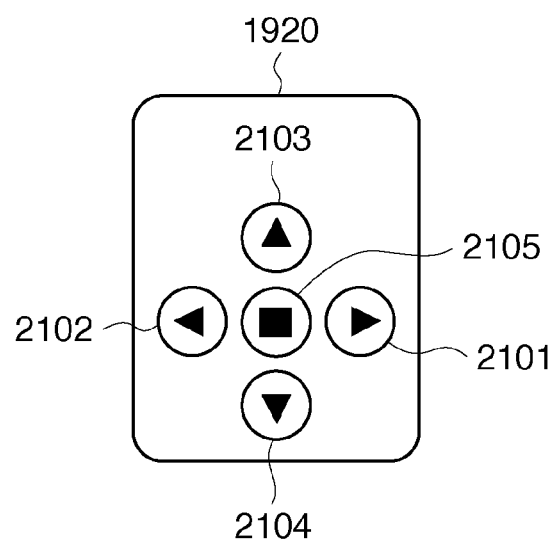
F I G. 21

FIG. 23

| ID | CONTENT NAME | EVENT 1 | EVENT 2 | EVENT 3 | CONTENT FILE NAME | THUMBNAIL FILE NAME |
|---|---|---|---|---|---|---|
| 0 | "photo0" | "HOBBY" | "FISHING" | "IZU OSHIMA" | "contents/photo0.jpg" | "thum/photo0_thum.jpg" |
| ... | ... | ... | ... | ... | ... | ... |
| 1000 | "photo1000" | "FAMILY" | "TRAVELING" | "GUAM" | "contents/photo1000.jpg" | "thum/photo1000_thum.jpg" |
| ... | ... | ... | ... | ... | ... | ... |
| 2000 | "photo2000" | "SCHOOL" | "KINDERGARTEN" | "ENTRANCE CEREMONY FOR KINDERGARTEN" | "contents/photo2000.jpg" | "thum/photo2000_thum.jpg" |
| 2100 | "photo2100" | "SCHOOL" | "ELEMENTARY SCHOOL" | "ENTRANCE CEREMONY" | "contents/photo2100.jpg" | "thum/photo2100_thum.jpg" |
| 2200 | "photo2200" | "SCHOOL" | "JUNIOR HIGH SCHOOL" | "ENTRANCE CEREMONY" | "contents/photo2200.jpg" | "thum/photo2200_thum.jpg" |
| 2210 | "photo2210" | "SCHOOL" | "JUNIOR HIGH SCHOOL" | "SEVENTH-GRADE FIELD TRIP" | "contents/photo2210.jpg" | "thum/photo2210_thum.jpg" |
| 2220 | "photo2220" | "SCHOOL" | "JUNIOR HIGH SCHOOL" | "SEVENTH-GRADE SPORTS DAY" | "contents/photo2220.jpg" | "thum/photo2220_thum.jpg" |
| 2230 | "photo2230" | "SCHOOL" | "JUNIOR HIGH SCHOOL" | "SEVENTH-GRADE CULTURAL FESTIVAL" | "contents/photo2230.jpg" | "thum/photo2230_thum.jpg" |
| 2300 | "photo2300" | "SCHOOL" | "HIGH SCHOOL" | "ENTRANCE CEREMONY" | "contents/photo2300.jpg" | "thum/photo2300_thum.jpg" |
| ... | ... | ... | ... | ... | ... | ... |
| 3000 | "photo3000" | "WORK" | "ASSOCIATES" | "NEW YEAR PARTY" | "contents/photo3000.jpg" | "thum/photo3000_thum.jpg" |
| ... | ... | ... | ... | ... | ... | ... |

2300

CONTENT DISPLAY APPARATUS AND DISPLAY METHOD THEREOF

BACKGROUND OF THE INVENTION

1. Field of the Invention

The present invention relates to a technique for displaying a plurality of contents according to the order of metadata added to each content.

2. Description of the Related Art

Nowadays, in addition to personal computers (PC) and dedicated storage devices, some devices, such as cameras for shooting content, also have storage functions. Some devices, such as disk recorders, store broadcast content. Further, a display device that displays the content stored in the device as a list is also available. In some display devices, a list of all content is displayed as text, for example, by the name of the content.

There has also been proposed a list-view display method, in which a content summary, such as a thumbnail of the content or a partial reproduction of a characteristic portion of the content, is displayed as an image or video. In the displayed list, the contents are displayed in various orders, for example, by date, file name, and so on; therefore, with such a display method, the content summary is displayed in an easily comprehendible manner and effectively in terms of the searchability of content.

Additionally, there is a method in which contents are arranged and grouped for easy searching. In such a case, the contents assembled into a group are indicated by a single icon or the like. The icon of the content group is made of, in many cases, an image of a representative content in the content group, or an image of some or all of the contents.

In these circumstances, to make searching for content easy when displaying the contents by a list, there has been proposed a method in which various sets of metadata are added to the contents, and the contents are arranged in the display order determined based on the metadata. The contents are arranged by, for example, date, the Japanese syllabary, or alphabetical order.

However, in the case where a user wishes to find a desired content while browsing contents, the user wishes to reach the desired content by moving through the contents as quick as possible. When a user searches for a target content while viewing contents in this fashion, high-speed in scrolling is important for visual searching of content.

Additionally, demand for browsing content on a television screen or the like has also been increasing, and there is demand for operations to be able to be carried out with a remote controller having only arrow keys or limited keys instead of freely operable operation units such as keyboards or mouses. That is, it has become increasingly important for operations to be able to be easily carried out with a small number of keys when a user is browsing contents by scrolling as well.

In one conventional technique, when continuous scrolling is carried out, only a number showing what number the content is in the total number of contents is displayed, and under usual circumstances, contents and thumbnails are displayed (Japanese Patent Laid-Open No. 2005-223632).

In another technique, the scroll speed is increased by a scroll speed acceleration signal by shortening the time of the motion interval between contents, and the scroll speed is decreased by a scroll speed deceleration signal by extending the time of the motion interval between contents (Japanese Patent Laid-Open No. 10-293675).

In another technique, scroll up/down keys are provided, and the scroll speed is changed depending on the number of times these keys are depressed (Japanese Patent Laid-Open No. 2000-67059).

Additionally, in recent years, digital home electronics such as digital cameras, digital video cameras, digital video disk recorders, and flat-screen televisions are rapidly becoming popular. Users are able to create and browse content data such as still pictures, videos, and the like by using these digital home electronics.

Users can also browse document data, presentation data, and graphic data created using PCs on televisions by linking personal computers (PCs) with set-top boxes or video game consoles.

Simple operations are required when browsing contents on the aforementioned digital home electronics, and a method called scrolling, where one or more contents are displayed in sequence, is generally used.

However, with the increasing capacity and decreasing price of storage media, the number of these contents keeps increasing, and therefore an efficient system for browsing an enormous volume of contents through the aforementioned scrolling is in demand.

The following technique has accordingly been disclosed. Upon reading out and displaying an image stored in a storage medium, a scroll bar is displayed by pressing a control button for a certain period of time. Then, time-series positional information for all of the images currently displayed on the scroll bar is displayed, to show the time when the image currently displayed was shot (Japanese Patent Laid-Open No. 2005-20209).

In another technique, upon displaying a certain display target, corresponding information associated with the display target is obtained, and the corresponding information is displayed in connection with a scroll bar that shows the relationships between all of the display targets that are to be displayed and the display target that is being displayed. A switch instruction of the display target is also obtained, so as to switch between the display of the display target and the display of the scroll bar (Japanese Patent Laid-Open No. 2006-285471).

With respect to browsing document data, the following technique is known. A scroll control unit displays a boundary on a scroll bar based on the width of the page section, and page numbers are displayed in each area on the scroll bar sectioned by the boundary (Japanese Laid-Open Patent Publication No. 05-282123).

However, the above-described conventional techniques have the following problems.

When controlling the scroll speed to an optimal speed to reach a target content, it is difficult for users to control the scroll speed so as to allow the contents to be visibly displayed while also scrolling at high speed.

Also, when switching the hierarchy level of the contents to skip and display the contents when scrolling so that the contents can be visibly checked, operations for switching the hierarchy level are necessary, and the scroll speed cannot be accelerated by a simple operation.

Furthermore, not knowing at which point the scroll accelerated, fine control of the scroll speed for approaching the target content cannot be performed with ease.

Also, when a scroll is carried out for a target content and the target content is bypassed or the scroll is stopped before the target content, a fine adjustment of the scroll speed to reach the content from that point cannot be performed with ease.

Additionally, it is not easy to visually check the acceleration, deceleration, stopping, and so on of the scrolling upon switching the hierarchy level of the contents.

SUMMARY OF THE INVENTION

It is an object of the present invention to provide an improvement in operation by allowing a user to grasp the position of a desired content while scrolling.

According to one aspect of the present invention, there is provided a content display apparatus that displays a plurality of contents according to the order of metadata added to each of the plurality of contents, the apparatus comprising: forming means for arranging the plurality of contents hierarchically by the metadata and groups of the metadata, and forming an array of the plurality of contents arranged hierarchically; display control means for displaying icons representing contents or icons representing groups on a display device according to the order of the array of the plurality of contents formed by the forming means; scroll control means for scroll displaying icons in a hierarchy level that the icons belong to when a scroll is made for the icons displayed by the display control means; scroll speed changing means for changing the scroll speed; and switching means for switching the hierarchy levels based on a scroll speed changed by the scroll speed changing means so as to scroll while displaying the icons of different hierarchy levels.

According to another aspect of the present invention, there is provided a content display apparatus that displays a plurality of contents according to the order of metadata added to each of the plurality of contents, the apparatus comprising: forming means for arranging the plurality of contents hierarchically by a group of the metadata, and forming an array of the plurality of contents arranged hierarchically; display control means for displaying icons representing contents on a display device according to the order of the array of the plurality of contents formed by the forming means; and indicator display means for selecting a hierarchy level of metadata arranged hierarchically by group based on the scroll speed when a scroll command is made for icons displayed by the display control means, and displaying the metadata of the selected hierarchy level as an indicator.

According to still another aspect of the present invention, there is provided a display method of a content display apparatus that displays a plurality of contents according to the order of metadata added to each of the plurality of contents, the method comprising: a forming step of forming an array of the plurality of contents in which the plurality of contents are arranged hierarchically by the metadata and a group of the metadata; a displaying step of displaying icons representing contents or displaying an icon representing a group on a display device according to the order of the array of plurality of contents formed in the forming step; a scroll control step of scroll displaying, when a scroll command is made for icons displayed in the display control step, an icon in the hierarchy level to which the icon belongs; a scroll speed change control step of changing the scroll speed; and a switching step of switching the hierarchy level so that icons in a different hierarchy level are displayed and scrolled based on the scroll speed changed by the scroll speed change control step.

According to yet another aspect of the present invention, there is provided a display method of a content display apparatus that displays a plurality of contents according to the order of metadata added to each of the plurality of contents, the method comprising: a forming step of arranging the plurality of contents hierarchically by a group of the metadata, and forming an array of the plurality of contents arranged hierarchically; a display control step of displaying icons representing contents on a display device according to the order of the array of plurality of contents formed in the forming step; and an indicator displaying step of selecting a hierarchy level of metadata arranged hierarchically by the group based on the scroll speed when a scroll command is made for icons displayed in the display control step, and displaying the metadata of the selected hierarchy level as an indicator.

Further features of the present invention will become apparent from the following description of exemplary embodiments (with reference to the attached drawings).

BRIEF DESCRIPTION OF THE DRAWINGS

FIG. 1 is a diagram illustrating an example of a system configuration in a first embodiment.

FIG. 7 is a diagram illustrating a scroll speed management table in the first embodiment.

FIG. 21 is a diagram illustrating an example of a configuration of an infrared remote controller 1920 in the second embodiment.

FIG. 23 is a diagram illustrating an example of content information in the second embodiment.

DESCRIPTION OF THE EMBODIMENTS

Preferred embodiments for carrying out the present invention are described in detail hereinafter with reference to the drawings.

[First Embodiment]

Described in the first embodiment is a content browsing device for browsing for a target content by arranging a plurality of contents hierarchically according to the order of metadata and metadata groups, and scroll displaying each hierarchy level. First, the overall system configuration is described.

(System Configuration)

FIG. 1 is a diagram illustrating an example of a system configuration in the first embodiment. In FIG. 1, 101 represents a content browsing device that holds icons of contents and content groups, and forms and arranges array of each icon for output to a display device 102. 102 represents a display device such as a display having a function for displaying icons of contents and content groups outputted from the content browsing device 101. 103 represents a remote operation controller having a function of inputting operations such as selection of contents and switching displays.

Icons representing contents are at least one of a content itself, a reduced image of the content, and an image which can be recognized as the content.

Figure 2:
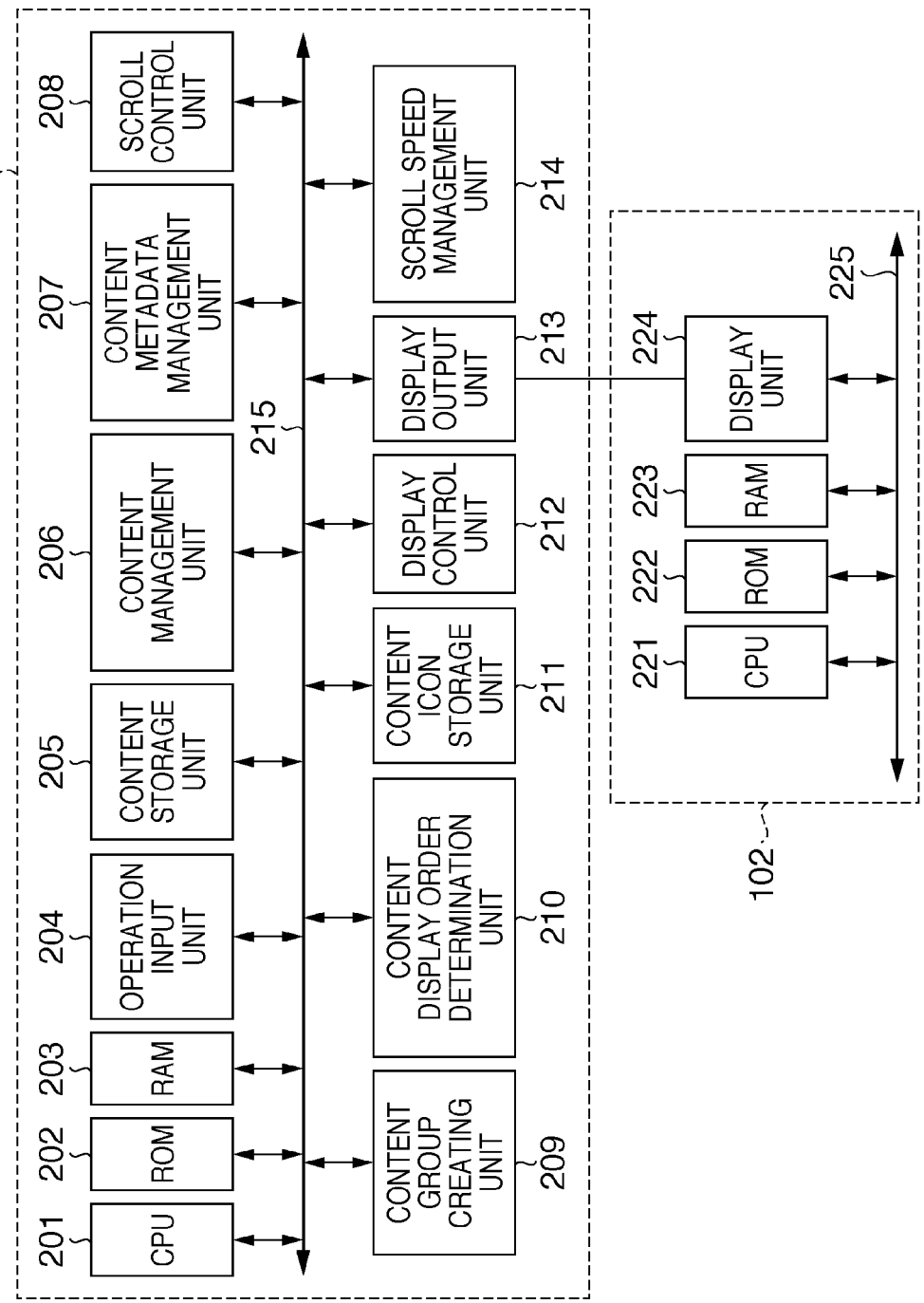
FIG. 2 is a block diagram illustrating a hardware configuration of a content browsing device 101 and a display device 102.

FIG. 2 is a block diagram illustrating a hardware configuration of the content browsing device 101 and the display device 102. In FIG. 2, 201 in the content browsing device 101 represents a central processing unit (CPU) that carries out processing of the device 101 as a whole according to programs and control data, to be mentioned later. 202 represents a ROM for storing, for example, the program and the control data of the CPU 201. 203 represents a RAM, i.e., a temporary storage region, defining a work area and various tables used while the CPU 201 is carrying out the processing.

204 represents an operation input unit for inputting operation commands outputted from the remote operation controller 103. 205 represents a content storage unit for holding contents to be a display target. 206 represents a content management unit for managing contents kept in the content storage unit 205. 207 represents a content metadata management unit for managing metadata added to the contents stored in the content storage unit 205.

Figures 3, 4:
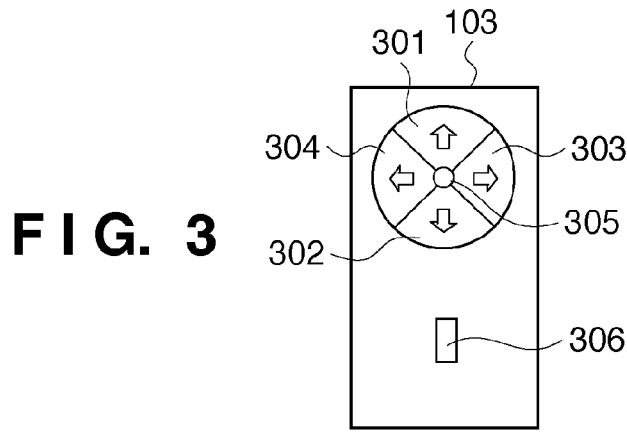
FIG. 3 is a diagram illustrating a hardware configuration of a remote operation controller 103.
FIG. 4 is a diagram illustrating a metadata management table in the first embodiment.

As shown in FIG. 4, metadata is added to each content, and further is arranged hierarchically by group. FIG. 4 is a diagram illustrating a metadata management table in the first embodiment. In an example shown in FIG. 4, metadata "soccer" is added to the contents 411 to 419, and metadata "golf" is added to the contents 421 to 427. Further, the contents 411 to 427 with metadata "soccer" and "golf" are grouped hierarchically into a metadata group "sports". The arrangement order of each metadata is also managed.

208 represents a scroll control unit for sequentially displaying the contents according to the array, and for controlling its speed. 209 represents a content group creating unit for grouping the contents managed by the content management unit 206 based on the added metadata, and grouping those contents at a higher hierarchy level. 210 represents a content display order determination unit for determining the order of display on the display device 102 by disposing the contents or the groups based on the metadata managed by the content metadata management unit 207.

211 represents a content icon storage unit for storing content icons corresponding to the contents. 212 represents a display control unit for creating an operation display data for switching the display of the content icons or group icons. 213 represents a display output unit for outputting the contents and the content icons, or the operation display data created by the display control unit 212 to the display device 102. 214 represents a scroll speed management unit for managing the timing for switching the scroll speed and the display based on commands such as acceleration, deceleration, and stopping from the operation input unit 204. 215 represents an internal bus.

The scroll speed management unit 214 switches the scroll speed and the display based on the values in a scroll speed management table as shown in FIG. 7.

Meanwhile, 221 in the display device 102 represents a central processing unit (CPU) that carries out processing of the display device 102 as a whole according to programs and control data. 222 represents a ROM for storing, for example, the program and the control data of the CPU 221. 223 represents a RAM, i.e., a temporary storage region, defining a work area and various tables used while the CPU 221 is carrying out the processing.

224 represents a display unit for displaying display image data produced in the display control unit 212 of the content browsing device 101 and outputted from the display output unit 213. 225 represents an internal bus.

FIG. 3 is a diagram illustrating a hardware configuration of a remote operation controller 103. In FIG. 3, 301 represents a key for designating an upward direction, 302 represents a key for designating a downward direction, 303 represents a key for designating a rightward direction, and 304 represents a key for designating a leftward direction. These keys 301 to 304 designate operations for scrolling the content icons in a predetermined direction. 305 represents an enter key for entering the selection and operation. 306 represents a stop key for stopping the scroll.

Figure 5:
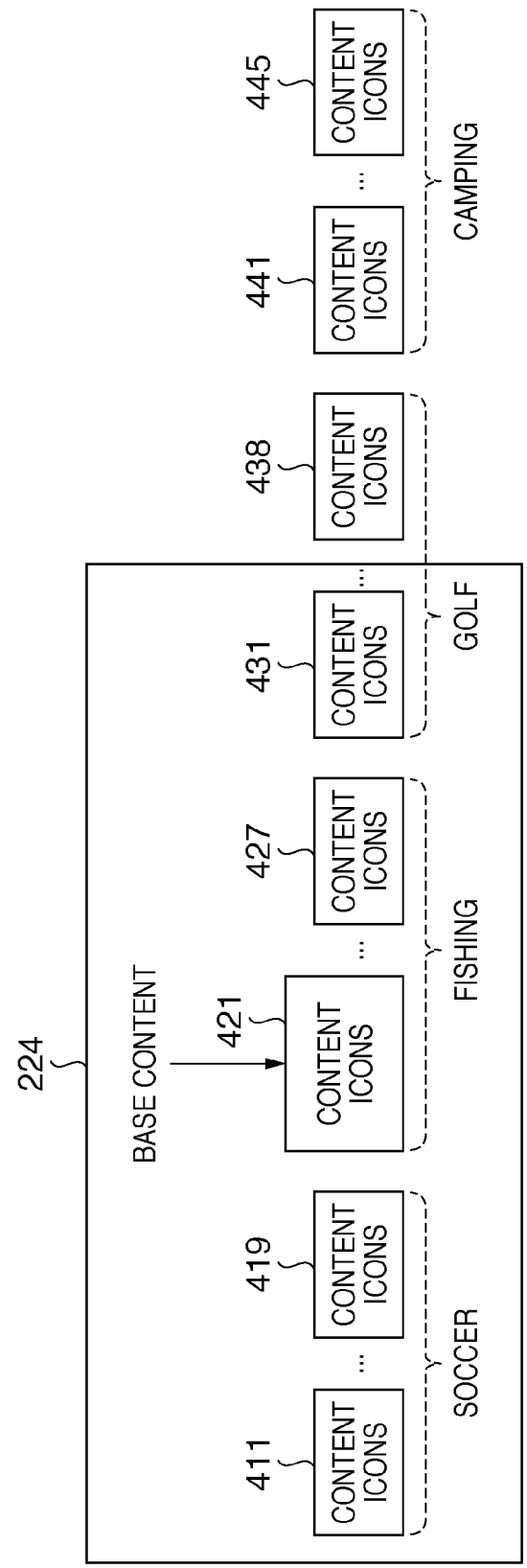
FIG. 5 is a diagram illustrating an example of a content display in the first embodiment.
Figure 6:
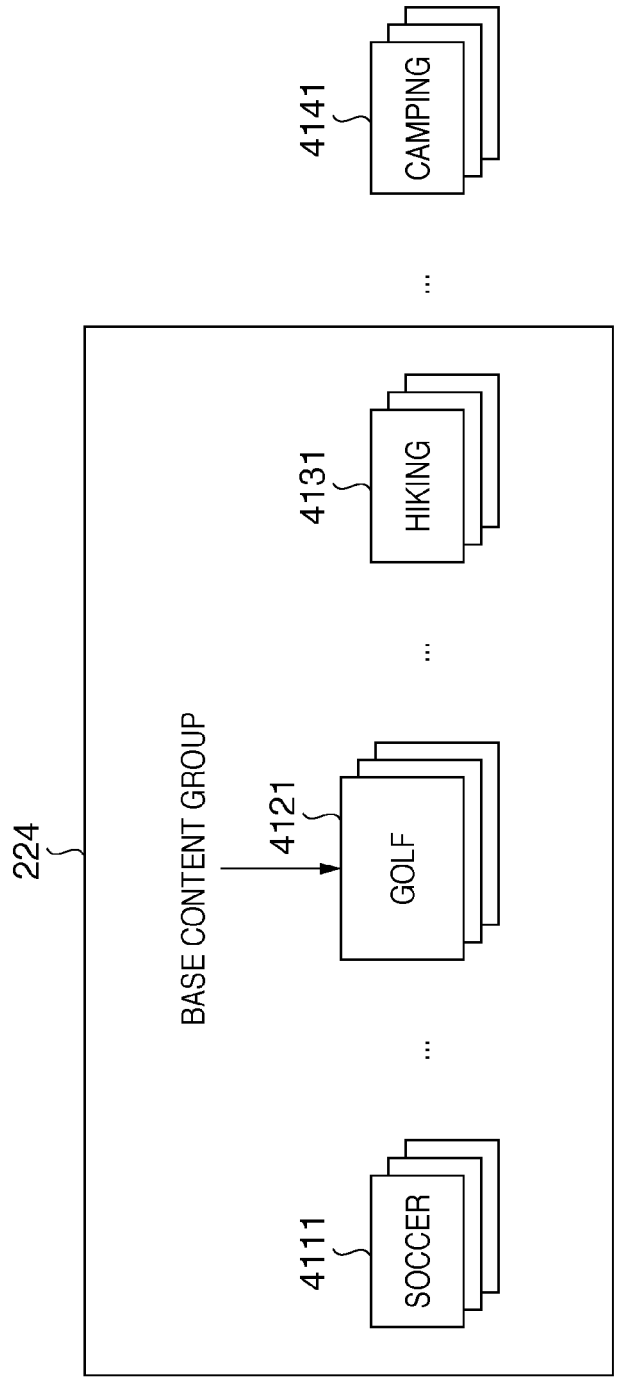
FIG. 6 is a diagram illustrating another example of a content display in the first embodiment.

FIG. 5 and FIG. 6 show examples of a content display in the first embodiment. In FIG. 5, content icons 411 to 445 are arranged and displayed in order by every metadata according to the metadata management table managed by the content metadata management unit 207. In this example, a plurality of contents can be displayed on a screen, and a base content is represented by the content icon (base icon) 421.

By designating scroll on this screen with the left and right direction keys 303 and 304 of the remote operation controller 103, the content icons shift in the direction opposite to the designated direction in the arranged order, and the base content shifts to a content in the designated direction. Afterwards, by depressing the enter key 305, the base content at that time is displayed.

In FIG. 6, group icons 4111 to 4141 are arranged and displayed in order by every metadata according to the metadata management table managed by the content metadata management unit 207. In this example as well, a plurality of content groups can be displayed on a screen, and a base content group is a content group represented by the group icon 4121.

By designating scroll on this screen with the left and right direction keys 303 and 304 of the remote operation controller 103, the group icons shift in the direction opposite to the designated direction in the arranged order, and the base content group shifts to a content group in the designated direction.

FIG. 7 is a diagram illustrating a scroll speed management table in the first embodiment. In the example shown in FIG. 7, the following are stored: switch-to-fast, i.e., a reference time for switching to a higher display hierarchy level upon increasing the scroll speed; switch-to-slow, i.e., a reference time for switching to a lower display hierarchy level upon decreasing the scroll speed; and switch-to-stop, i.e., a reference time for switching to a lower display hierarchy level when stopping the scroll.

The switch-to-fast represents a reference time for display interval upon scrolling the content icons or the group icons, and the display is switched to a higher hierarchy level when the display interval becomes shorter than the criterion time. Switch-to-fast 1 shows a reference time for switching the display hierarchy level from the first hierarchy level the second hierarchy level, and switch-to-fast 2 shows a reference time for switching the display hierarchy level from the second level to the third hierarchy level.

The switch-to-slow is a reference time for display interval upon scrolling the content icons or the group icons, and the display is switched to a lower hierarchy level when the display interval has become longer than the criterion time. Switch-to-slow 1 shows a reference time for switching the display hierarchy level from the second to the first hierarchy level, and switch-to-slow 2 shows a reference time for switching the display hierarchy level from the third to the second hierarchy level.

The switch-to-stop shows a holding time at the time of a stop before switching to another hierarchy level. For example, switch-to-stop 1 shows a holding time before switching from the second to the first hierarchy level, and switch-to-stop 2 shows a holding time before switch from the third to the second hierarchy level.

Figure 8:
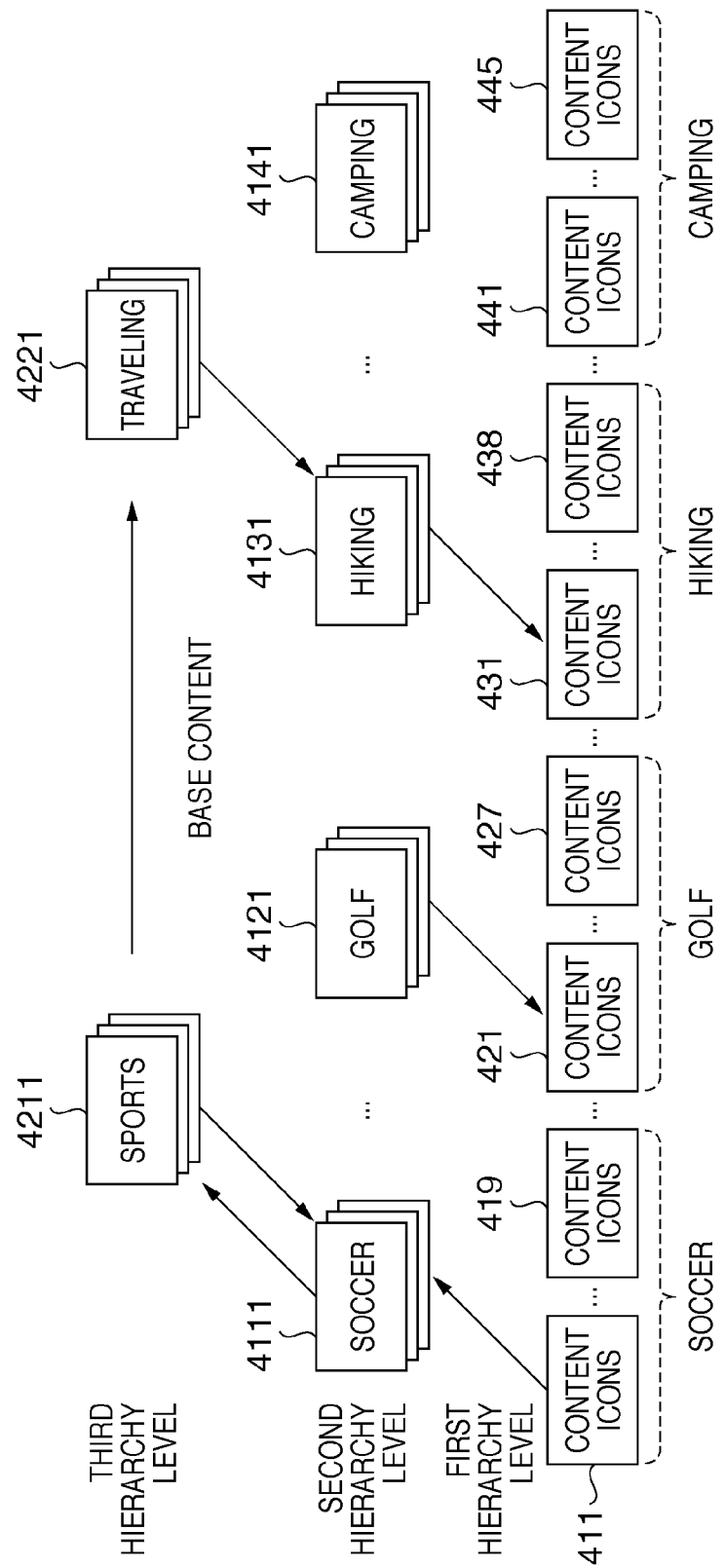
FIG. 8 is a diagram illustrating a first example of accelerating, decelerating, and stopping the scrolling.
Figure 9:
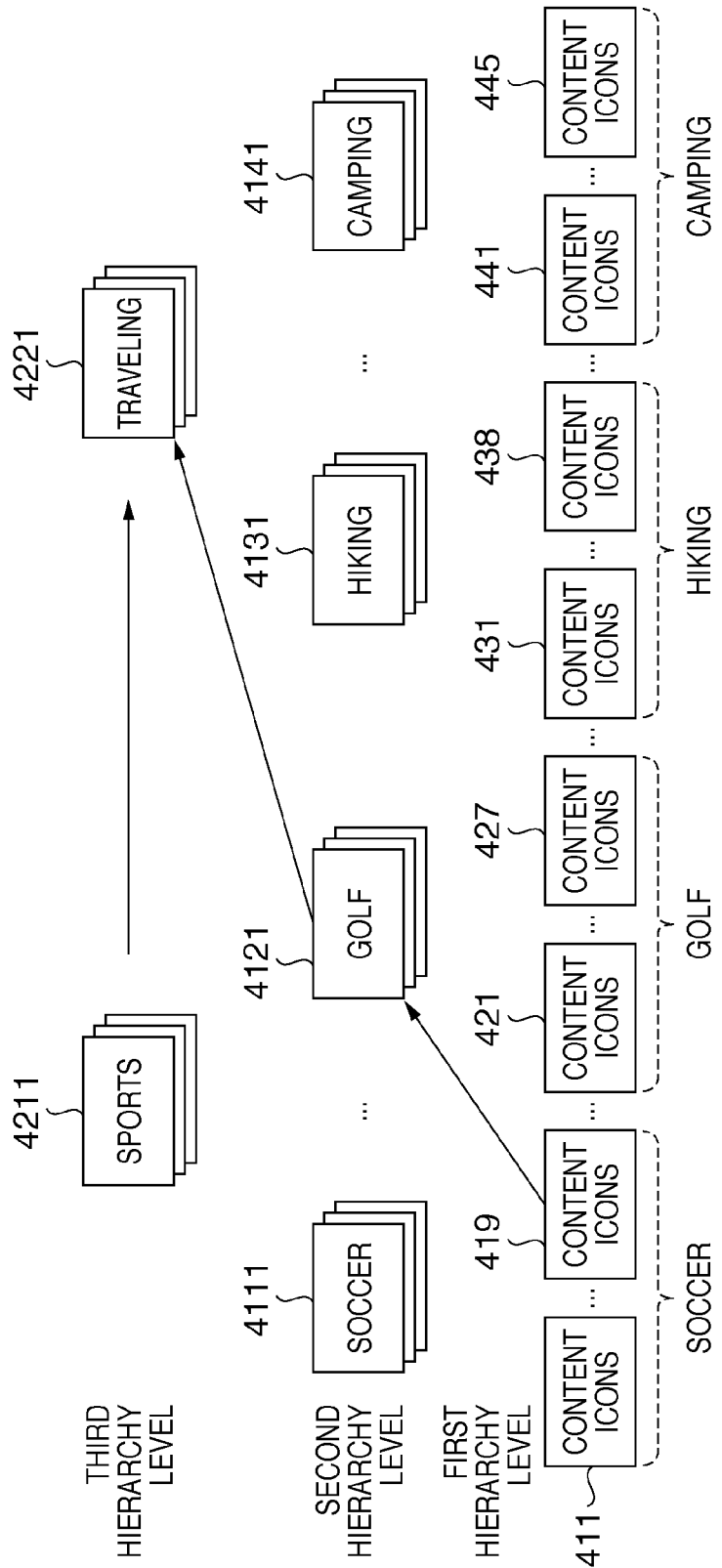
FIG. 9 is a diagram illustrating a second example of accelerating the scroll.
Figure 10:
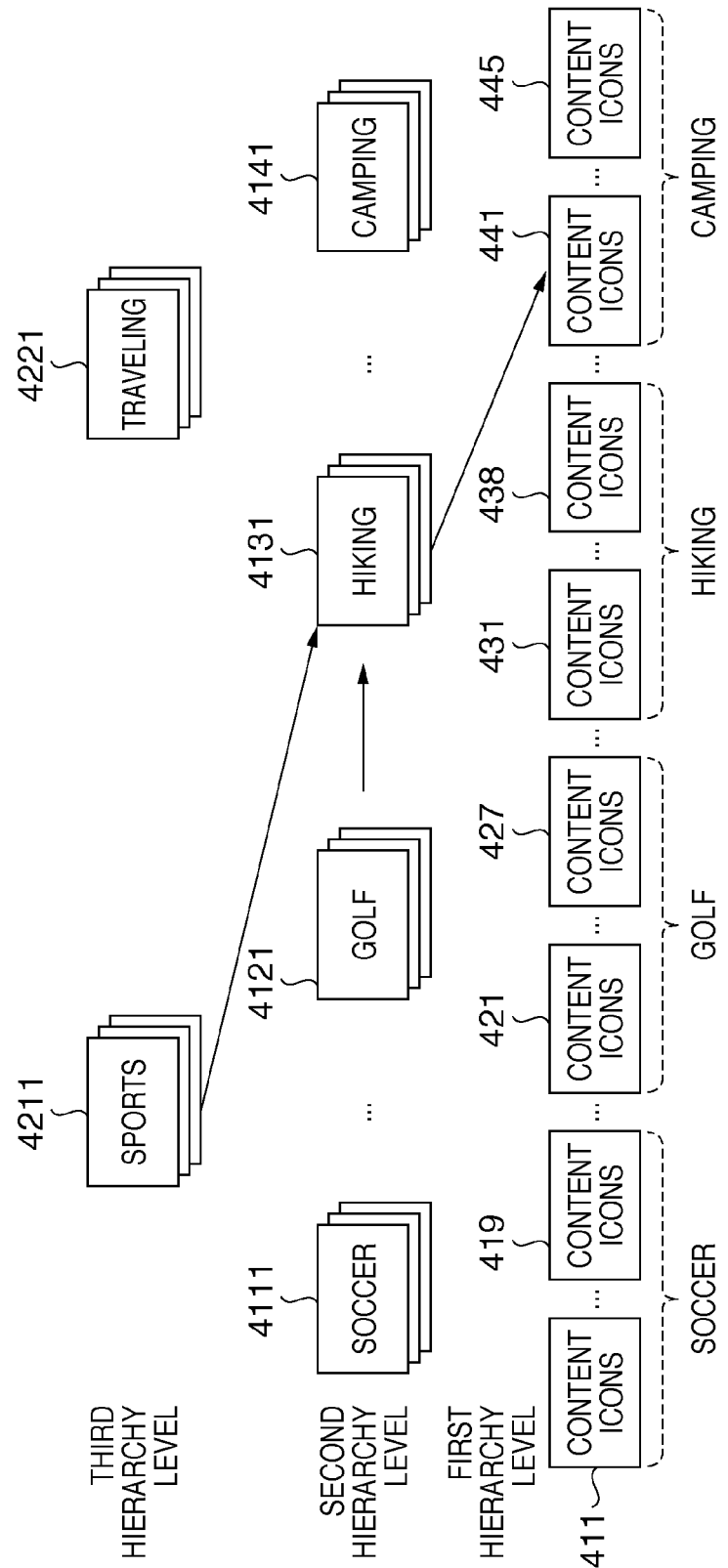
FIG. 10 is a diagram illustrating a second example of decelerating the scrolling.

FIG. 8 to FIG. 10 are diagrams illustrating display shifts of the contents/content groups. FIG. 8 is a diagram illustrating a first example when accelerating, decelerating, and stopping the scrolling. First, when the display interval of the content icons becomes shorter than the time shown in switch-to-fast 1 while accelerating the scroll in the first hierarchy level, the display is switched, for example, from the content icon 411 to the group icon 4111, to which the content icon 411 belongs, thereby allowing the scroll to be carried out in the second hierarchy level. Further, when the display interval of the group icons becomes shorter than the time shown in switch-to-fast 2, display is switched, for example, from the group icon 4111 to the group icon 4211 to which the group icon 4111 belongs, thereby allowing the scroll to be carried at the third hierarchy level. At this time, the scroll speed at the time of switching is maintained.

Next, when the display interval of the group icons becomes longer than the time shown in switch-to-slow 2 while decreasing the scroll speed in the third hierarchy level, the display changes, for example, from the group icon 4211 to the first group icon 4111 belonging to the group icon 4211. Further, when the display interval of the group icons became longer than the time shown in switch-to-slow 1, the display switches, for example, from the group icon 4121 to the first content icon 421 belonging to the group icon 4121. At this time, the scroll speed at the time of switching is maintained.

When the time exceeds the time shown in switch-to-stop 2 while stopping the scroll in the third hierarchy level, the display changes, for example, from the group icon 4221 to the first group icon 4131 belonging to the group icon 4221. Further, when the time exceeds the time shown in switch-to-stop 1, the display changes, for example, from the group icon 4131 to the first content icon 431 belonging to the group icon 4131. At this time, when the scroll resumes, the scroll starts at that hierarchy level.

FIG. 9 is a diagram illustrating a second example at the time of accelerating the scroll. When the content icon display interval became shorter than the time shown in switch-to-fast 1 while accelerating the scroll in the first hierarchy level, first, the scroll is carried out to the last the content icon in the same group. For example, the scroll is carried out to the content icon 419, and from that point, the display changes to the group icon 4121 where the next content icon 421 belongs, and the scroll is carried out in the second the hierarchy level. Further, when the group icon display interval became shorter than the time shown in switch-to-fast 2, the scroll is carried out to the last group icon in the same group. For example, the scroll is carried out to the group icon 4121, and from that point, the display changes to the group icon 4221 where the next group icon 4131 belongs, and the scroll is carried out in the third hierarchy level. At this time, the scroll speed becomes the speed with the reference time for switching to a higher hierarchy level, and the content icon display interval is the time shown in switch-to-fast 3.

FIG. 10 is a diagram illustrating the second example at the time of decelerating the scrolling. When the content icon display interval became longer the time shown in switch-to-slow 2 while scrolling in the third hierarchy level, the display changes, for example, from the group icon 4211 to the first group icon 4131 belonging to the next group icon 4221. Further, when the content icon display interval became longer than the time shown in switch-to-slow 1, the display changes, for example, from the group icon 4131 to the first content icon 441 belonging to the next group icon 4141. At this time, the scroll speed is the speed with the reference time for switching to a lower hierarchy level, and the content icon display interval is the time shown in switch-to-slow 1.

Figure 11:
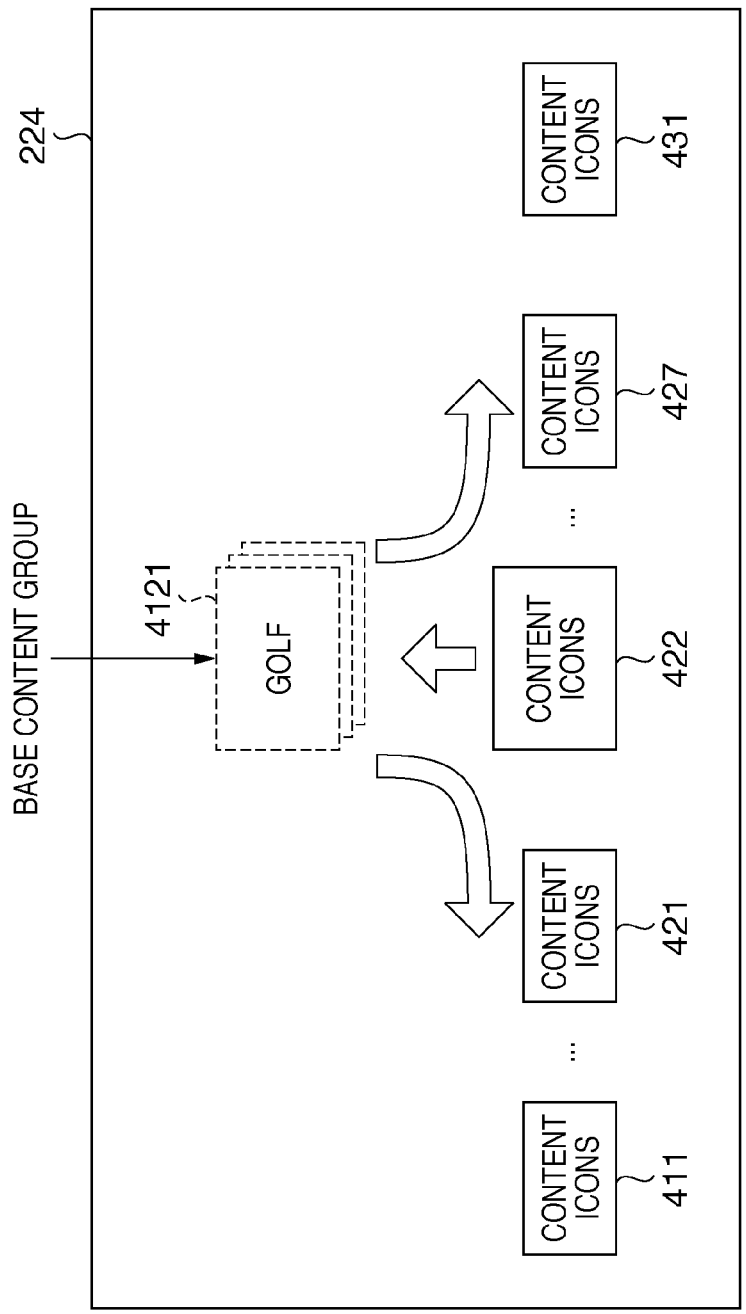
FIG. 11 is a diagram illustrating a content display upon switching to a lower hierarchy level.
Figure 12:
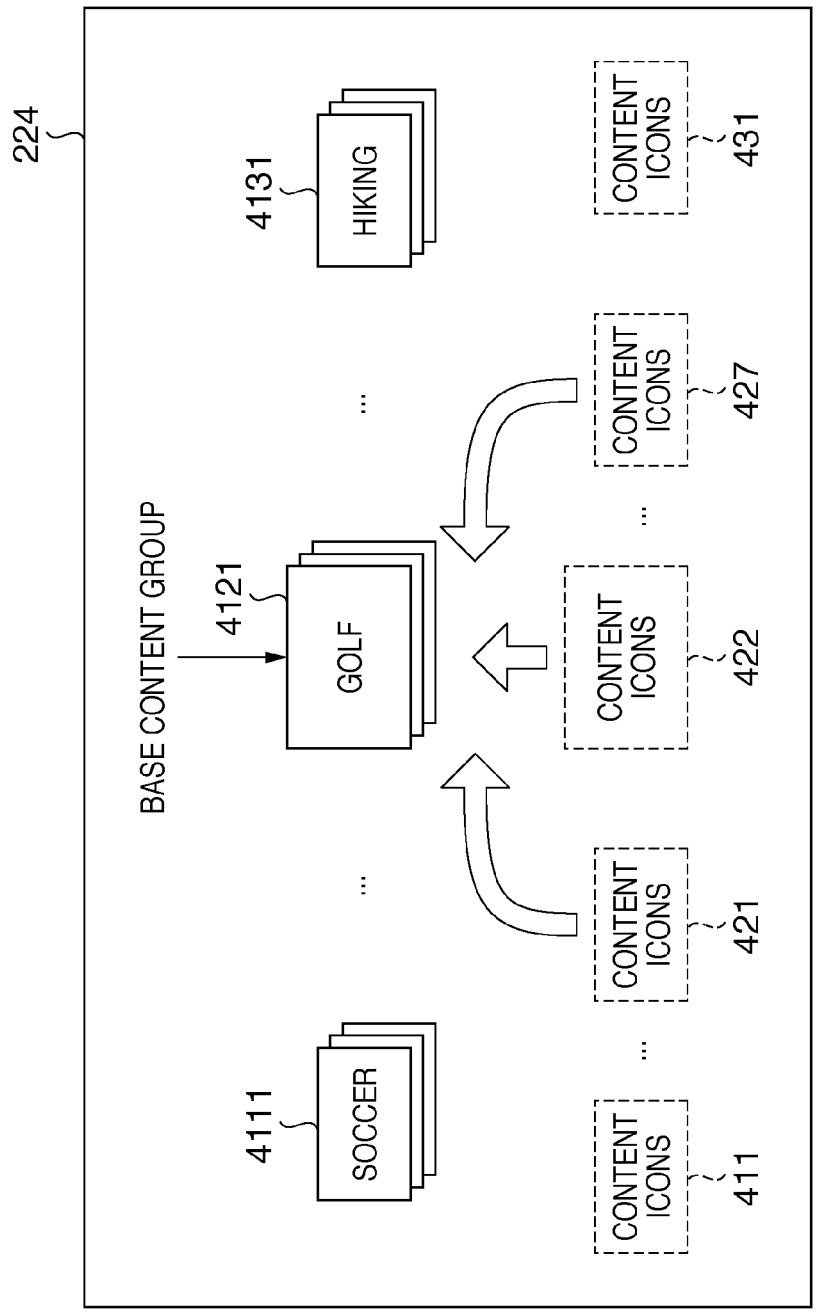
FIG. 12 is a diagram illustrating a content display upon switching to a higher hierarchy level.

FIG. 11 and FIG. 12 are diagrams illustrating a content display upon switching the hierarchy level. FIG. 11 is a display upon switching to a lower hierarchy level, and an animation is shown by which the group icon 4121 showing the base content group diverges into the content icons 421 to 427, and the display changes to the content array at the lower hierarchy level.

FIG. 12 is a display upon switching to a higher hierarchy level, and an animation is shown by which the content icons 421 to 427 converge into the group icon 4121 representing the base content group and the display changes to the content array at the higher hierarchy level.

(Detailed Description of Operations)

In the following, specific operations of the content browsing device in several situations are described. First, operations at the time of acceleration of the scroll in the above-described first example are described with reference to FIG. 13, FIG. 15, and FIG. 17.

Figure 13:
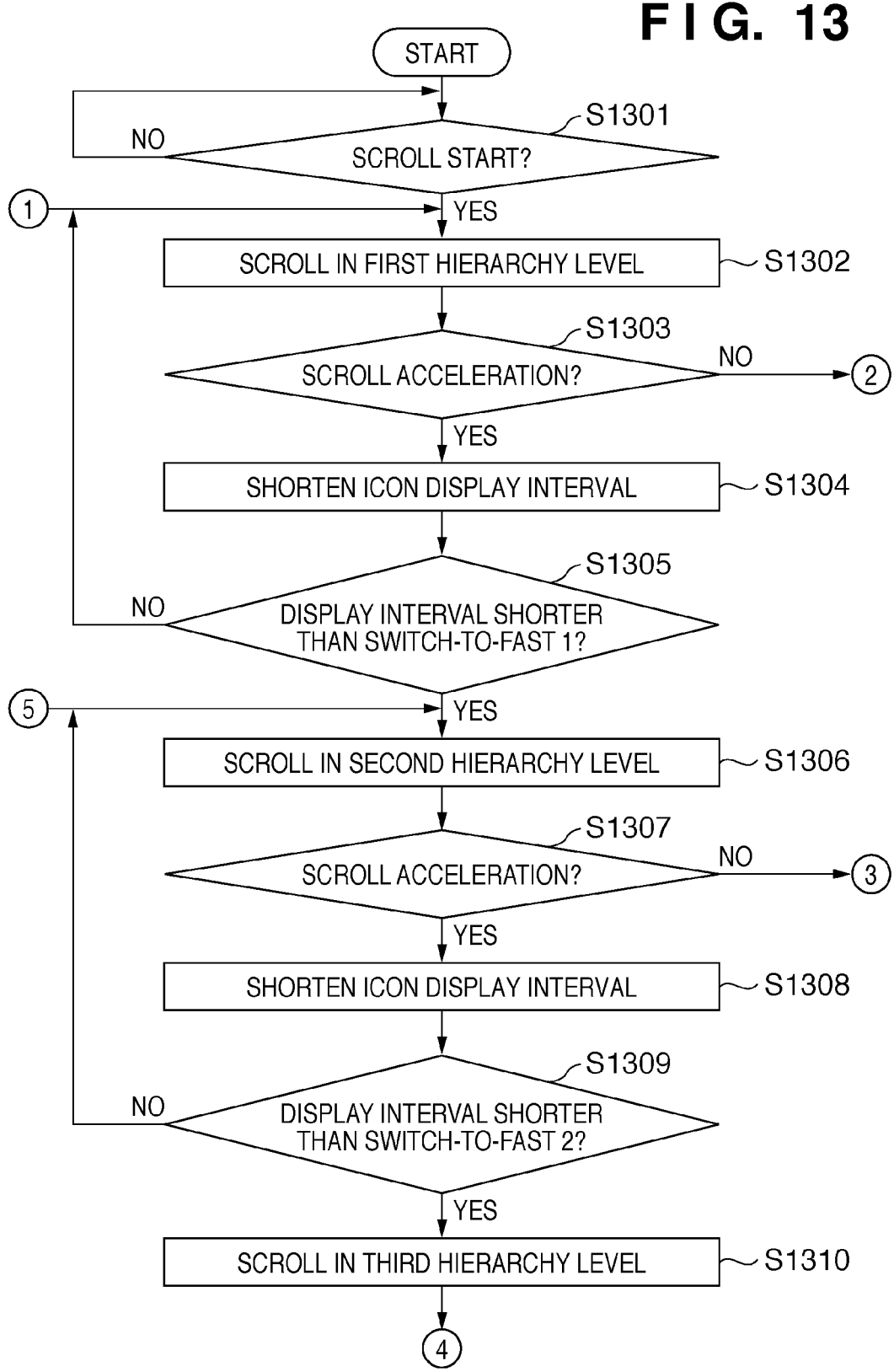
FIG. 13 is a flowchart illustrating operations executed at the time of acceleration of the scroll in the first example.

FIG. 13 is a flowchart illustrating operations executed at the time of acceleration of the scroll in the first example. First, when the right direction key 303 of the remote operation controller 103 is pressed to start scroll (YES in S1301), scroll is carried out for the content icons in the first hierarchy level (S1302). Next, if there is no command of the scroll speed acceleration (NO in S1303), the scroll is carried out in the first hierarchy level at a constant speed (S1711). When there is a command for stopping the scroll under such conditions (YES in S1712), a base content icon in the first hierarchy level is displayed and this operation is terminated.

Meanwhile, when the right direction key 303 is kept in depressed state, it is determined that an acceleration command has been made (YES in S1303), and the icon display switching interval is shortened to increase the scroll speed (S1304). When the icon display switching interval is shorter than the time shown in switch-to-fast 1 of the scroll management table as shown in FIG. 7 (NO in S1305), the process returns to S1302, and the scroll in the aforementioned first hierarchy level is maintained. However, when the time became shorter than the time shown in switch-to-fast 1 (YES in S1305), the display is changed to the group icons in the second hierarchy level where the base content belongs, and the scroll is carried out at the speed at the time of the changing of the display (S1306). If there is no command for scroll acceleration at this point (NO in S1307), the scroll is carried out at a constant speed in the second hierarchy level (S1505).

Meanwhile, when the right direction key 303 is kept in a depressed state, it is determined that an acceleration command has been made (YES in S1307), and the icon display switching interval is shortened to increase the scroll speed (S1308). When the icon display switching interval is not shorter than the time shown in switch-to-fast 2 of the scroll management table as shown in FIG. 7 (NO in S1309), the scroll in the second hierarchy level is maintained (S1306).

When the icon display switching interval became shorter than the time shown in switch-to-fast 2 (YES in S1309), the display is changed to the group icons of the third hierarchy level where the base content belongs, and the scroll is carried out at the speed at the time of the changing of the display (S1310). Then, the scroll is carried out in the third hierarchy level (S1501).

Based on the above, the scroll speed can be controlled by simple operation without performing an operation for switching the hierarchy level. Additionally, even if a fast scroll is carried out, content visibility is secured.

Figure 15:
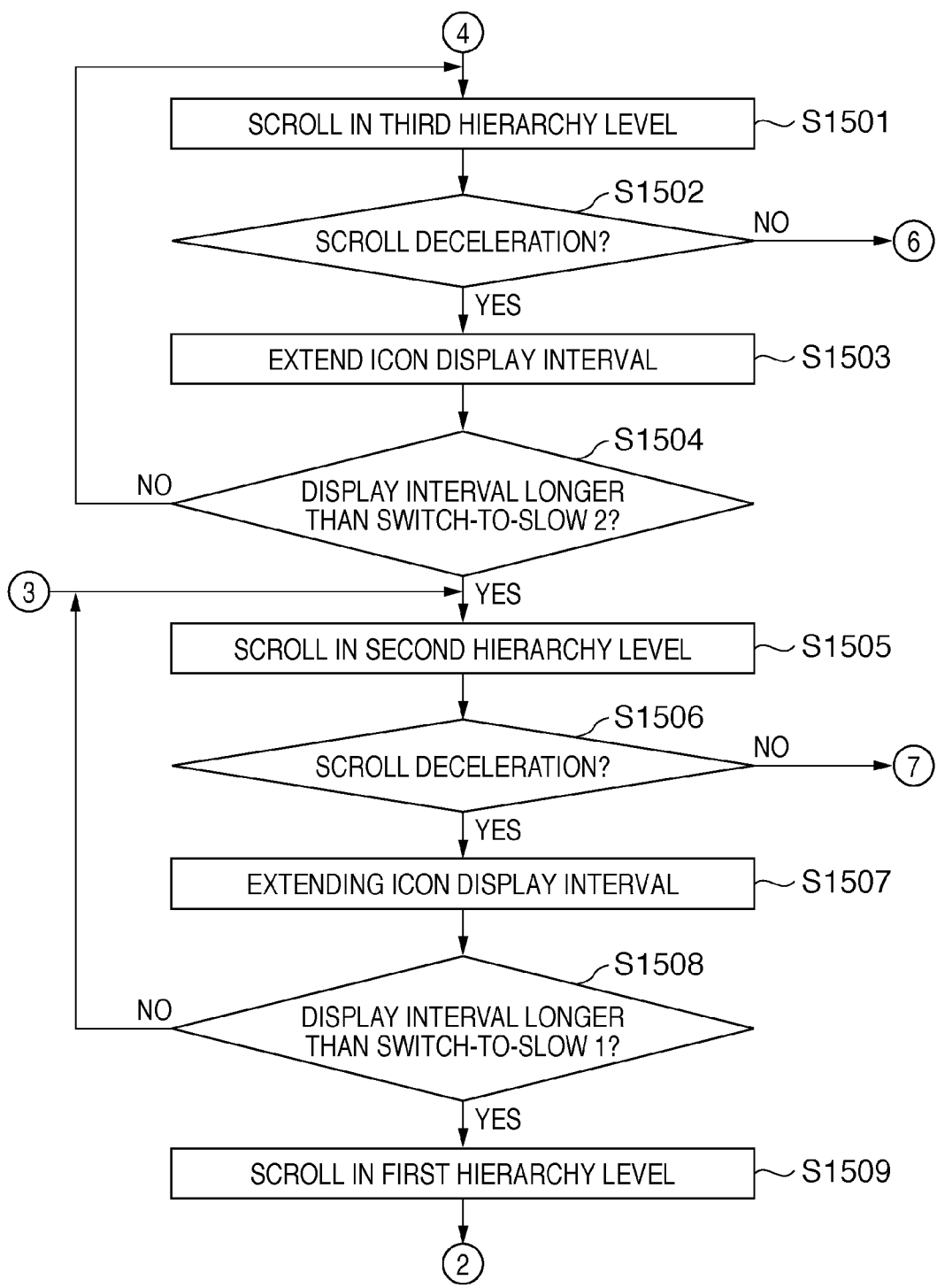
FIG. 15 is a flowchart illustrating operations executed at the time of deceleration of the scrolling in the first example.

FIG. 15 is a flowchart illustrating operations executed at the time of deceleration of the scrolling in the first example. When the third hierarchy level is being scrolled through in the rightward direction (S1501) and there is no command for the deceleration of the scrolling, the scroll is carried out at a constant speed in the third hierarchy level (S1701). Meanwhile, when the left direction key 304 is depressed, i.e., a command for decreasing the speed is made (YES in S1502), the scroll speed is decreased by increasing the icon display switching interval (S1503). Then, when the icon display switching interval is not longer than the time shown in switch-to-slow 2 of the scroll management table as shown in FIG. 7 (NO in S1504), the scrolling is maintained in the third hierarchy level (S1501).

Meanwhile, when the icon display switching interval is longer than the time shown in switch-to-slow 2 (YES in S1504), the display is switched to the first group icon belonging to the base content group in the group icons in the second hierarchy level, and the scroll is carried out at the speed at the time of the switching (S1505).

Afterwards, if there is no command for decreasing the scroll speed (NO in S1506), scroll is carried out at a constant speed in the second hierarchy level (S1709). However, when the left direction key 304 is pressed, it is determined that a command to decrease the speed is made (YES in S1506), and the scroll speed is decreased by increasing the icon display switching interval (S1507). Then, when the icon display switching interval is not longer than the time shown in switch-to-slow 1 of the scroll management table as shown in FIG. 7 (NO in S1508), the scroll in the second hierarchy level is maintained (S1505).

Next, when the icon display switching interval became longer than the time shown in switch-to-slow 1 (YES in S1508), the display is changed to the first content icon belonging to the base content group among the content icons of the first hierarchy level, and the scroll is carried out at the speed at the time of the switching (S1509). Then, the scroll is carried out in the first hierarchy level (S1711).

Based on the above, the scroll speed can be controlled by simple operation without an operation for switching the hierarchy level to approach the target content.

Figure 17:
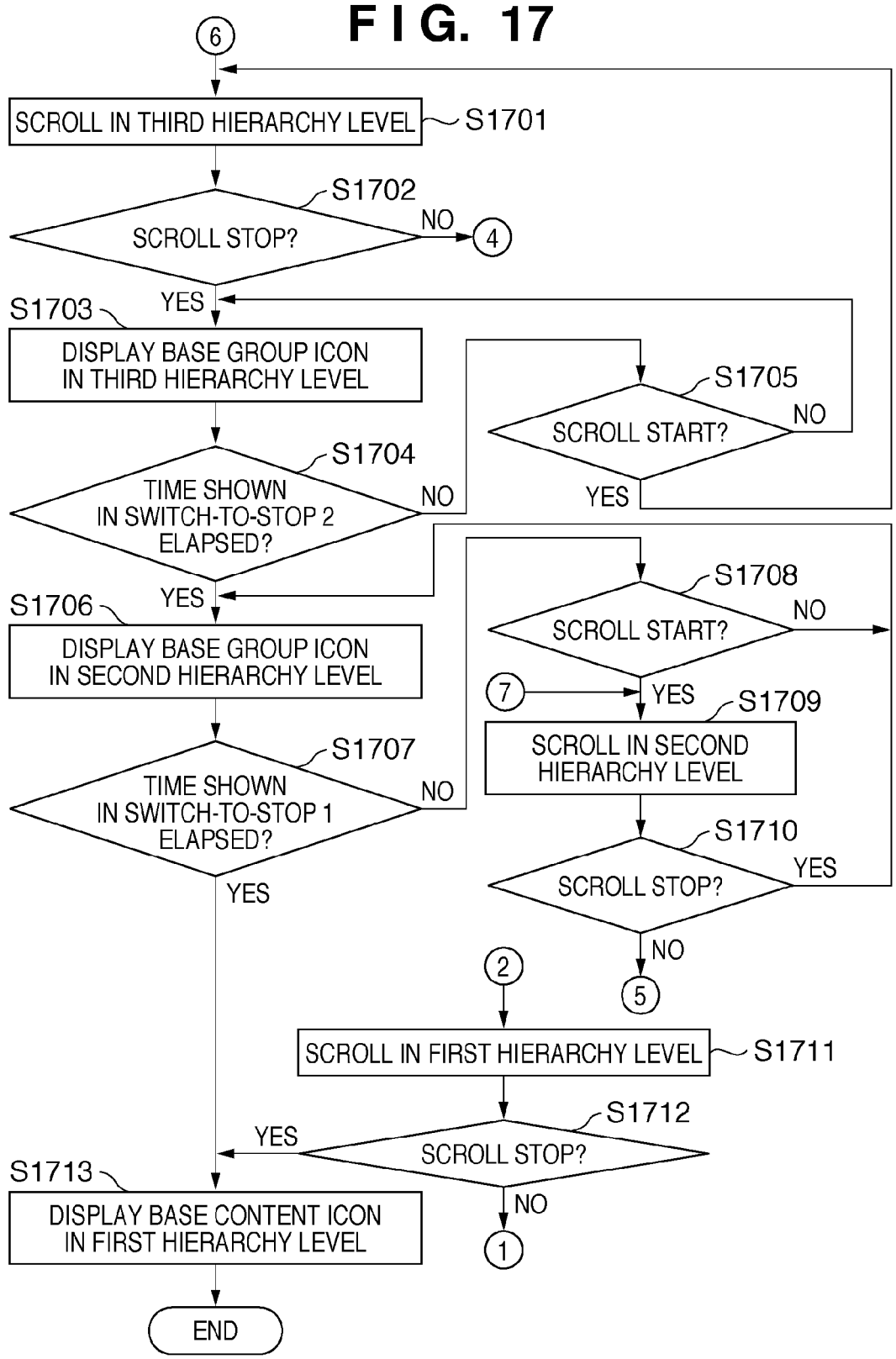
FIG. 17 is a flowchart illustrating operations executed at the time of stopping the scrolling.

FIG. 17 is a flowchart illustrating operations executed upon stopping the scrolling. First, upon scrolling in the third hierarchy level (S1701), if there is no command to stop the scroll (NO in S1702), the scroll is carried out at a constant speed in the third hierarchy level (S1501 or S1601). However, when the stop key 306 is pressed to make a stop command (YES in S1702), the icon of the base content group in the third hierarchy level is displayed, and the scroll is stopped (S1703).

Then, the scroll is stopped until the time shown in switch-to-stop 2 of the scroll management table in FIG. 7 elapses (S1704). At that time, when a command for scroll start is made with the right direction key 303 or the left direction key 304 (YES in S1705), the scroll is carried out in the designated direction at the third hierarchy level (S1701).

However, when there is no command for scroll start and the time shown in switch-to-stop 2 has elapsed (YES in S1704), the display is changed to the first group icon of the group icon belonging to the base content group in the second hierarchy level (S1706). Further, the scroll is stopped until the time shown in switch-to-stop 1 is elapsed (S1707). At that time, when a command for scroll start is made with the right direction key 303 or the left direction key 304 (YES in S1708), scroll is carried out in the designated direction at the second hierarchy level (S1709).

However, when there is no command for scroll start and the time shown in switch-to-stop 1 has elapsed (YES in S1707), the display is changed to the first content icon in the content icons in the first hierarchy level belonging to the base content group (S1713).

Also, when scrolling in the second hierarchy level (S1709) and there is no command for scroll stop (NO in S1710), the scroll is maintained at a constant speed in the second hierarchy level (S1306 or S1408). However, when the stop key 306 is pressed under such conditions to make a command for stop (YES in S1710), the icon of the base content group in the second hierarchy level is displayed (S1706), and an operation to stop is carried out.

Meanwhile, when the scroll is carried out in the first hierarchy level (S1711), and there is no command for scroll stop, the scroll is maintained at a constant speed in the first hierarchy level (S1302 or S1402). However, when the stop key 306 is pressed under such conditions to make a command for stop (YES in S1712), the icon of the base content group in the first hierarchy level is displayed and the scroll is stopped (S1713).

Based on the above, when scrolling to a target content but the target content is passed or the scroll is stopped before reaching the target, the scroll can be resumed easily from that point with a desired scroll speed to reach the content.

Next, operations upon accelerating the scroll in the above-described second example are described with reference to FIG. 14, FIG. 16, and FIG. 17.

Figure 14:
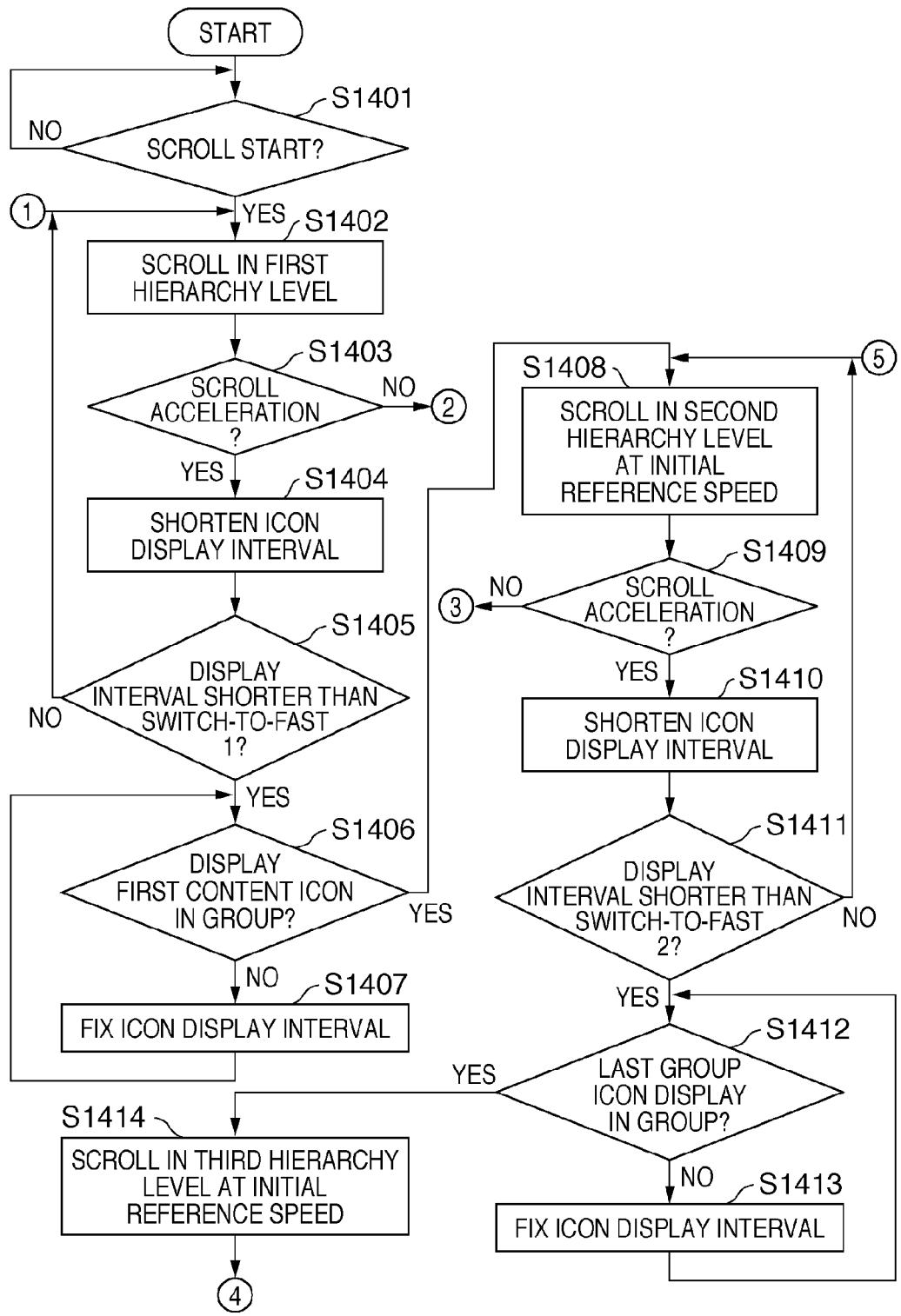
FIG. 14 is a flowchart illustrating operations executed at the time of acceleration of the scrolling in the second example.

FIG. 14 is a flowchart illustrating operations executed upon acceleration of the scrolling in the second example. First, when the right direction key 303 of the remote operation controller 103 is pressed to start scroll (YES in S1401), scroll is carried out for the content icons in the first hierarchy level (S1402). Next, if there is no command for the scroll acceleration, (NO in S1403), the scroll is carried out in the first hierarchy level at a constant speed (S1711). When there is a command for stopping the scroll under such conditions (YES in S1712), the base content icon in the first hierarchy level is displayed and this operation is terminated.

Meanwhile, when the right direction key 303 is kept in a depressed state, it is determined that an acceleration command has been made (YES in S1403), and the icon display switching interval is shortened to increase the scroll speed (S1404). When the icon display switching interval is longer than the time shown in switch-to-fast 1 of the scroll management table as shown in FIG. 7 (NO in S1405), the process returns to S1402, and the scroll in the aforementioned first hierarchy level is maintained.

However, when the time became shorter than the time shown in switch-to-fast 1 (YES in S1405), a confirmation is made as to whether the content is the last content in the group to which the base content belongs (S1406). At this point, if the display shows a content other than the last content (NO in S1406), the icon display switching interval is fixed (S1407). However, if the display is of the last content icon in the group (YES in S1406), the display is changed to the group icon of the second hierarchy level to which the next content icon belongs, and the scroll is carried out with the time shown in the reference time for switching the hierarchy (S1408). If there is no command for the acceleration of the scroll at this point (NO in S1409), scroll is carried out at a constant speed in the second hierarchy level (S1606).

Meanwhile, when the right direction key 303 is kept in a depressed state, it is determined that an acceleration command has been made (YES in S1409), and the icon display switching interval is shortened to increase the scroll speed (S1410). Then, when the icon display switching interval is not shorter than the time shown in switch-to-fast 2 of the scroll management table as shown in FIG. 7 (NO in S1411), the scroll in the second hierarchy level is maintained (S1408).

Meanwhile, when the switching interval of icon display becomes shorter than the time shown in switch-to-fast 2 (YES in S1411), a confirmation is made as to whether the content group is the last content group in the group to which the base content group belongs (S1412). At this point, if the display is of a content group icon other than the last content group (NO in S1412), the switching interval of icon display is fixed (S1413). However, when the icon displayed is of the last content group in the group (YES in S1412), the display is changed to the group icon of the third hierarchy level to which the next group icon belongs, and the scroll is carried out with the reference time upon switching the hierarchy level (S1414). Then, the scroll is carried out in the third hierarchy level (S1601).

Based on the above, control that obtains an optimal scroll speed can be made, and the point at which the scroll speed is accelerated can be clearly understood, making it possible to subtly adjust the scroll speed with ease.

Figure 16:
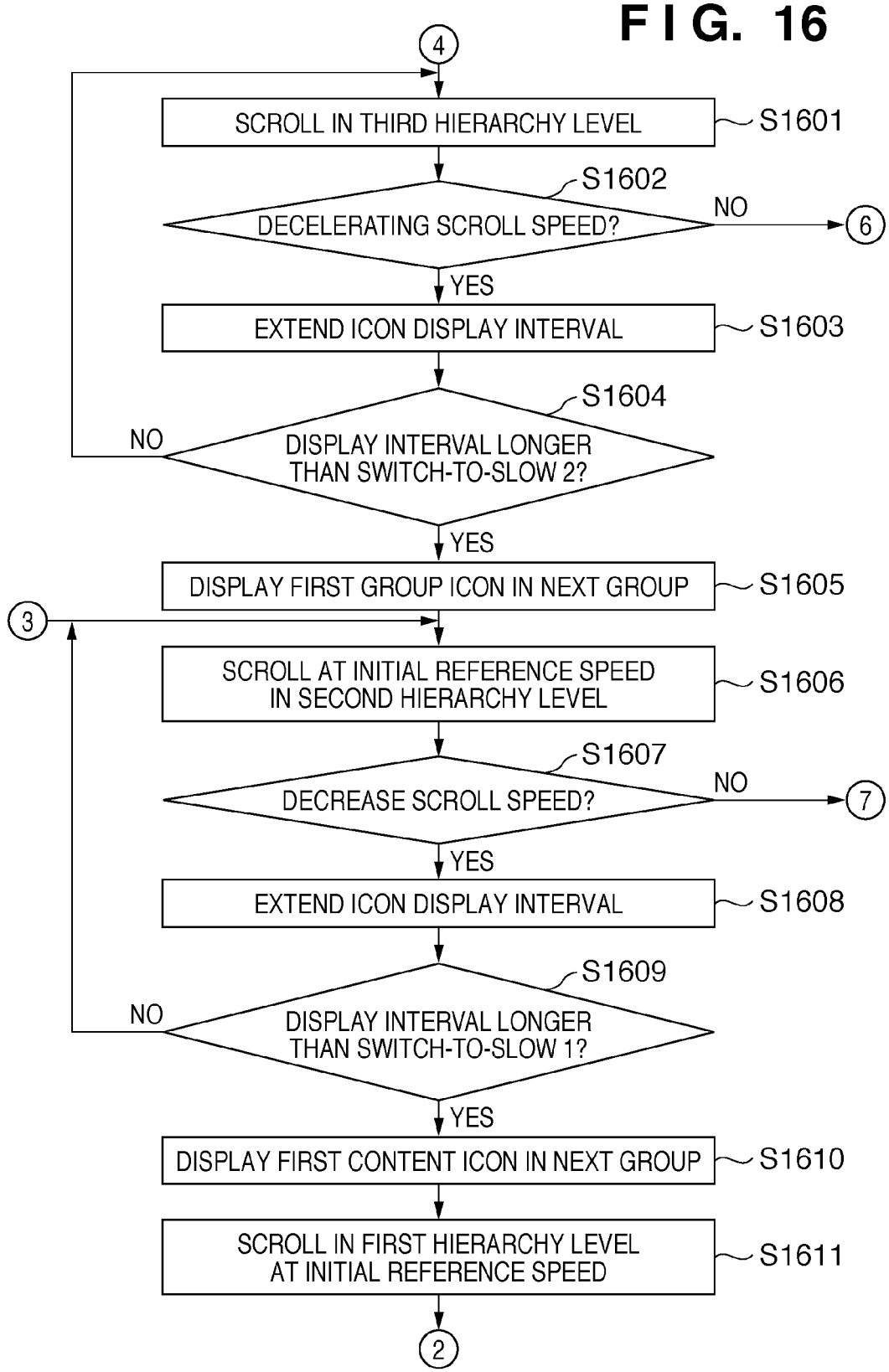
FIG. 16 is a flowchart illustrating operations executed at the time of deceleration of the scrolling in the second example.

FIG. 16 is a flowchart illustrating operations executed at the time of deceleration of the scrolling in the second example. When the third level of the hierarchy is being scrolled through in the rightward direction (S1601), and there is no command for the deceleration of the scrolling, the scroll is carried out at a constant speed in the third hierarchy level (S1701). On the other hand, when the left direction key 304 is depressed, i.e., a command for decreasing the speed is made (YES in S1602), switching interval of display icon is made longer to decrease the scroll speed (S1603). Then, when the switching interval of icon display is not longer than the time shown in switch-to-slow 2 of the scroll management table as shown in FIG. 7 (NO in S1604), the scrolling is maintained in the third hierarchy level (S1601).

On the other hand, when the switching interval of icon display is longer than the time shown in switch-to-slow 2 (YES in S1604), the display is changed to the first group icon in the group icons of the second hierarchy level belonging to the content group next to the base content group (S1605). Then, scroll is carried out at an initial reference speed upon changing to a lower hierarchy level (S1606).

Afterwards, if there is no command for decreasing the scroll speed (NO in S1607), scroll is carried out at a constant speed in the second hierarchy level (S1709). However, when the left direction key 304 is pressed, it is determined that a command for decrease in speed has been made (YES in S1607), and switching interval of icon display is made longer to decrease the scroll speed (S1608). Then, when the switching interval of icon display is not longer than the time shown in switch-to-slow 1 of the scroll management table as shown in FIG. 7 (NO in S1609), the scroll in the second hierarchy level is maintained (S1606).

Then, when the switching interval of icon display became longer than the time shown in switch-to-slow 1 (YES in S1609), the display is changed, in the first hierarchy level, to the first content icon of the content icons belonging to the content group next to the base content group (S1610). Then, the scroll is carried out at the initial reference speed upon changing to a lower hierarchy (S1611). Then, the scroll is carried out in the first hierarchy level (S1711).

Based on the above-described, a control can be made for an optimal scroll speed, and a point at which the scroll speed is decreased is clear, allowing a subtle adjustment of the scroll speed easily.

Although the reference time for switching is different depending on the levels in the hierarchy in the first embodiment, the reference time may be the same for all the levels in the hierarchy.

Also, in the first embodiment, although the acceleration operation is carried out by keeping the right direction key 303 of the remote operation controller 103 depressed, the acceleration command may be determined to occur after a certain period of time has passed following scrolling at a constant speed.

In this way, a plurality of situations can be easily distinguished; for example, depressing the key once shifts to the next icon, depressing the key for up to a certain period of time scrolls at a constant speed, and depressing the key for more than the certain period of time is a command for acceleration.

Also, although the descriptions discuss using the scroll on the rightward direction as an example in the first embodiment, the operation can be made in a similar manner in the case of a scroll in the leftward direction as well, and even in the case where the contents are arranged to be disposed in a vertical direction, a similar operation can be carried out by using the upward direction key 301 and the downward direction key 302 of the remote operation controller 103.

Figure 18:
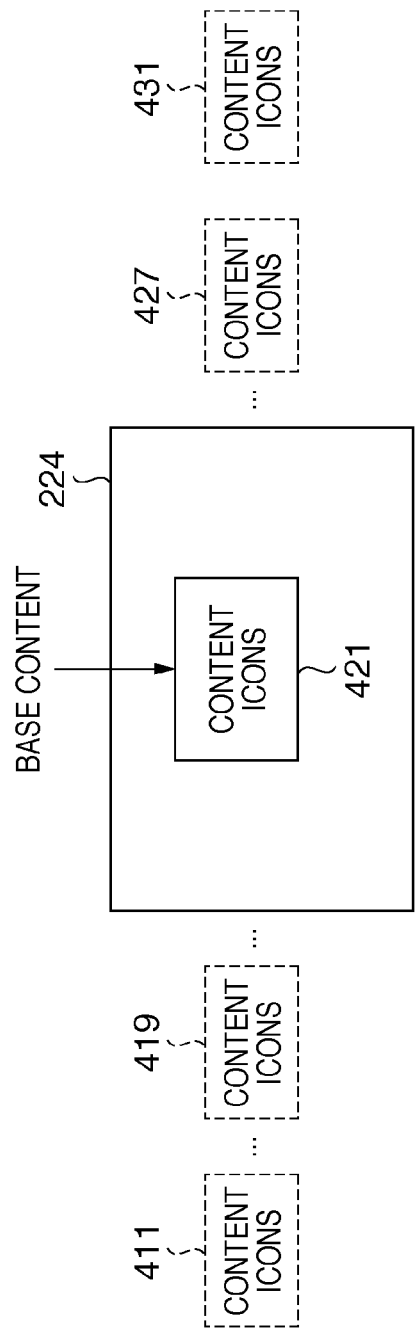
FIG. 18 is a diagram illustrating a content display according to a variation on the first embodiment.

Further, in the first embodiment, a plurality of contents are arranged to be disposed in the display unit 224. However, as shown in FIG. 18, the display may be for only one icon of the base content/base content group, and the next icons may be displayed one by one while scrolling.

According to the first embodiment, the display is visible and the scroll speed can be controlled to be an optimal speed, allowing a user to reach a desired content in a short period of time.

Also, the scroll speed can be controlled by a simple operation without an operation to switch the hierarchy level.

Furthermore, acceleration, deceleration, and stopping by switching the content hierarchy level can be visually confirmed with ease.

[Second Embodiment]

Hereinafter, a second embodiment according to the present invention is described in detail with reference to the figures.

Figure 19:
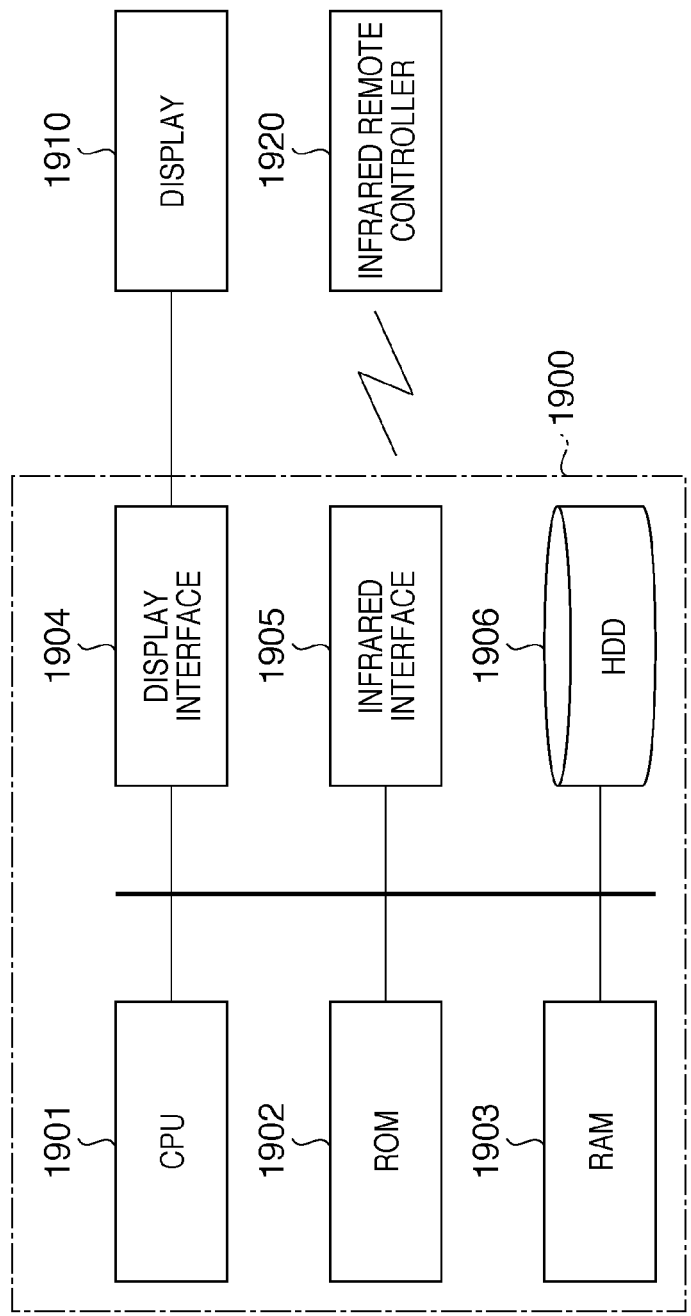
FIG. 19 is a diagram illustrating a hardware configuration of a data browsing device in a second embodiment.

FIG. 19 is a diagram illustrating a hardware configuration of a data browsing device in the second embodiment. The hardware of a data browsing device 1900 is configured of a CPU 1901, a ROM 1902, a RAM 1903, a display interface 1904, an infrared input interface 1905, and a hard disk drive (HDD) 1906.

The CPU 1901 temporarily stores processing programs, various information, device drivers, and an operating system (OS) stored in the HDD 1906 in the RAM 1903 as appropriate and executes them. The ROM 1902 stores a boot program and the like executed by the CPU 1901 for starting the OS stored in the HDD 1906 when turning on the power. The display interface 1904 converts display information from a display device driver (not shown) into signals processable by the display 1910. The infrared input interface 1905 receives infrared signals from the infrared remote controller 1920, and converts them into information processable by an infrared interface device driver (not shown).

In the following, unless otherwise specified, the same reference numerals are used for those described in other figures, and their descriptions are omitted.

Figure 20:
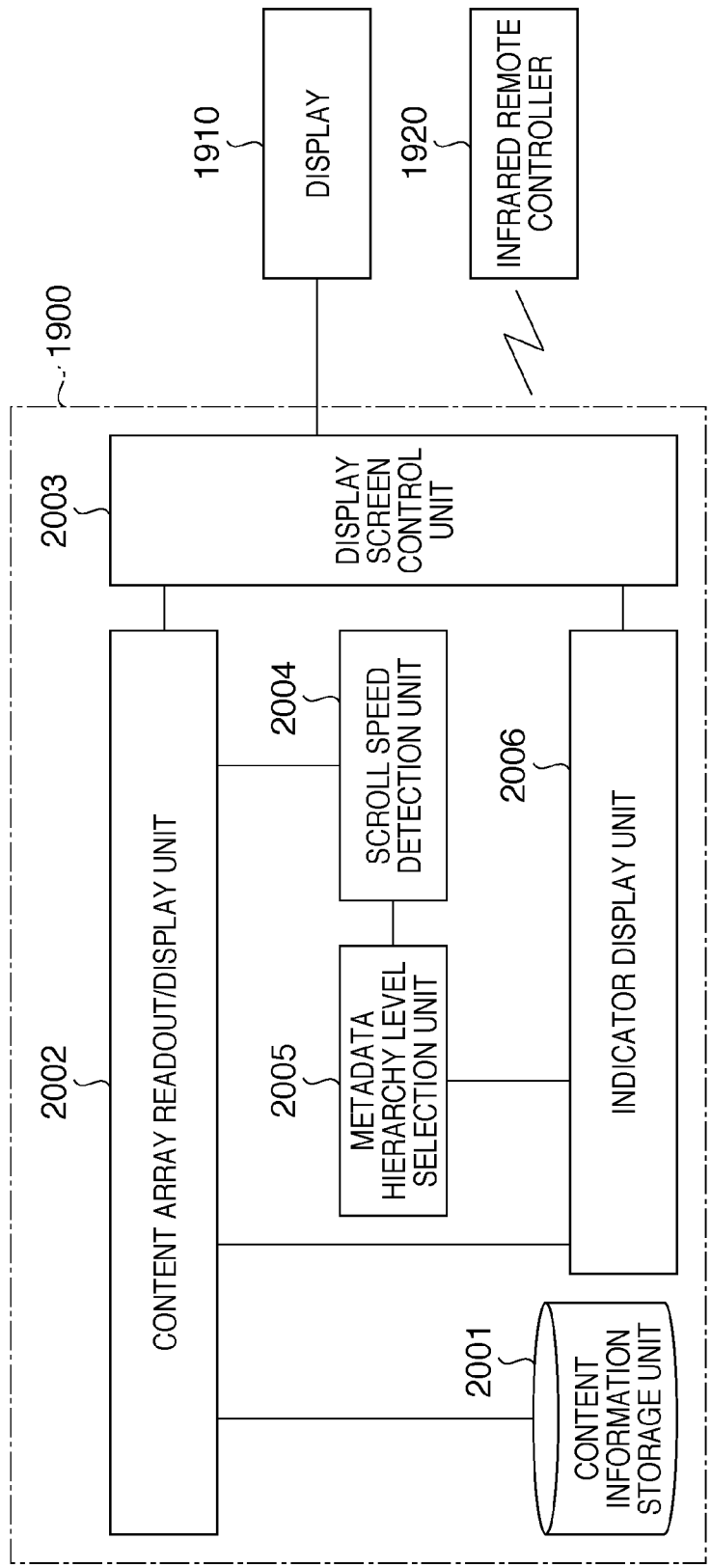
FIG. 20 is a diagram illustrating a functional configuration of a data browsing device in the second embodiment.

FIG. 20 is a diagram illustrating a functional configuration of the data browsing device in the second embodiment. The data browsing device 1900 is configured to include a content information storage unit 2001, a content array readout/display unit 2002, a display screen control unit 2003, a scroll speed detection unit 2004, a metadata hierarchy level selection unit 2005, and an indicator display unit 2006. The content information storage unit 2001 uses a storage area of the HDD 1906 to store content information (FIG. 23), which shall be mentioned later. The content array readout/display unit 2002 reads out the content information and thumbnails from the content information storage unit 2001, based on the content array (FIG. 24) to be mentioned later, and displays the contents on the display 1910 via the display screen control unit 2003.

The display screen control unit 2003 displays a user interface screen (FIG. 25 or FIG. 26) to be mentioned later on the display 1910, to tell the operational input from the infrared remote controller 1920 to the content array readout/display unit 2002. The scroll speed detection unit 2004 detects the speed of the scroll while the scroll display is carried out by the content array readout/display unit 2002. The metadata hierarchy level selection unit 2005 selects a metadata hierarchy level in which changes in the display of the indicator averagely fall within in a preset range according to the scroll speed detected by the scroll speed detection unit 2004. The indicator display unit 2006 displays an indicator (bottom portion shown in FIG. 25 or FIG. 26), to be mentioned later, in line with the scroll display of the contents by the content array readout/display unit 2002 based on the metadata of the hierarchy level selected by the metadata hierarchy level selection unit 2005.

FIG. 21 is a diagram illustrating an example of a configuration of the infrared remote controller 1920 in the second embodiment. The infrared remote controller 1920 is configured to include a right button 2101 for designating a rightward scroll, a left button 2102 for designating a leftward scroll, an acceleration button 2103 for scroll speed, a deceleration button 2104 for scroll speed, and a scroll stop button 2105.

Note that the infrared remote controller 1920 is an illustration of an example, and the array, names of the buttons, functions of the buttons, and so on are not limited to those shown in the example.

Figure 22:
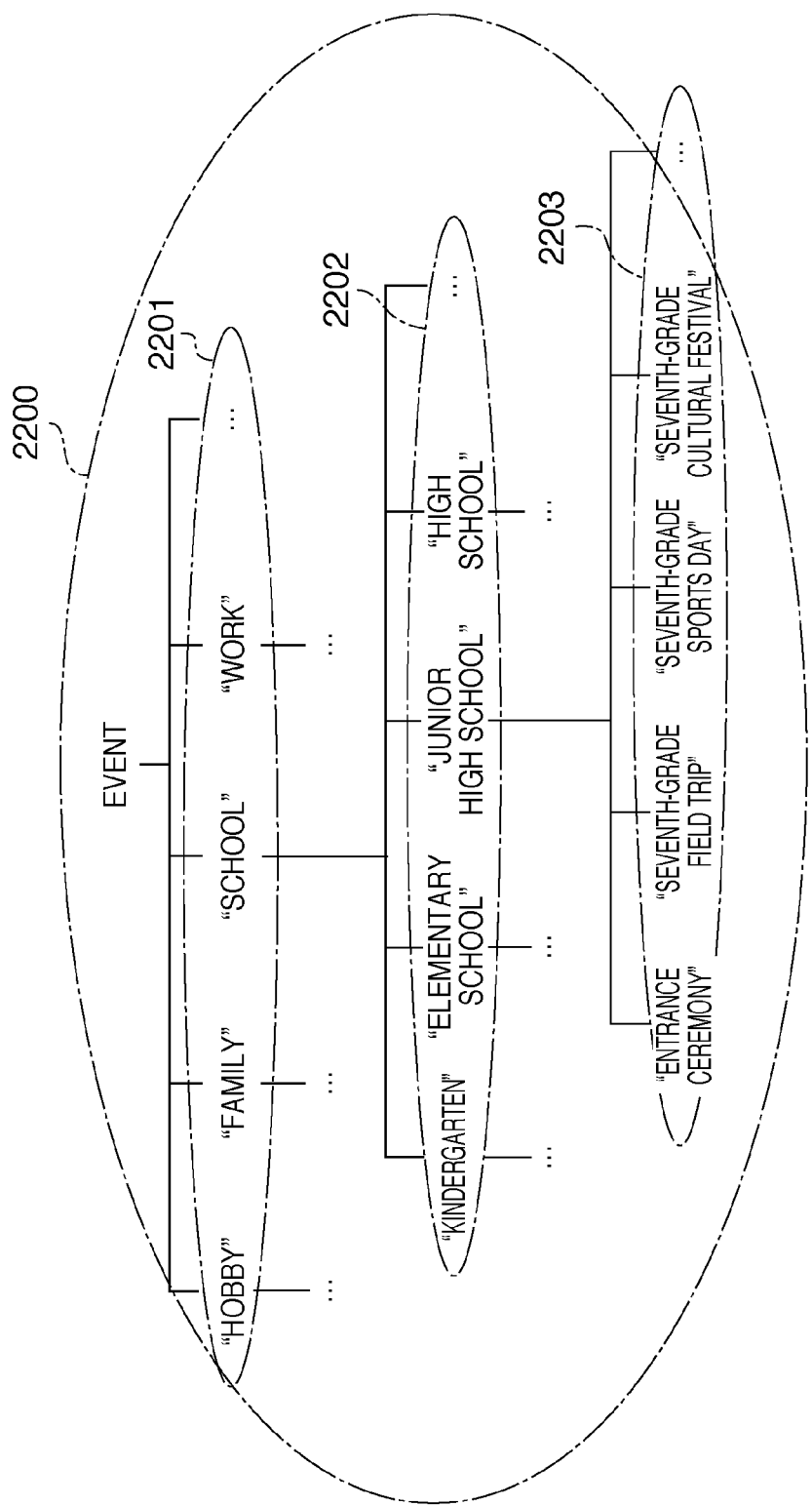
FIG. 22 is a diagram illustrating an example of a metadata hierarchical structure in the second embodiment.

FIG. 22 is a diagram illustrating an example of a metadata hierarchical structure in the second embodiment. As shown in FIG. 22, a metadata hierarchy 2200 illustrating a hierarchy of metadata of events is configured to include a highest hierarchy level 2201, a mid-hierarchy level 2202, and a lowest hierarchy level 2203. In this example, the highest hierarchy level 2201 includes metadata such as "hobby", "family", "school", and "work". The mid-hierarchy level 2202 includes metadata such as "kindergarten", "elementary school", "junior high school", and "high school". The lowest hierarchy level 2203 includes metadata such as "entrance ceremony", "seventh-grade field trip", "seventh-grade sports day", and "seventh-grade cultural festival".

"Kindergarten", "elementary school", "junior high school", and "high school" in the mid-hierarchy level 2202 subordinately belong to "school" in the highest hierarchy level 2201. Similarly, "entrance ceremony", "seventh-grade field trip", "seventh-grade sports day", and "seventh-grade cultural festival" in the lowest hierarchy level 2203 subordinately belong to "junior high school" of the mid-hierarchy level 2202.

Note that the contents of the metadata and hierarchies in FIG. 22 are shown as an example, and the present invention is not limited thereto.

FIG. 23 is a diagram illustrating an example of content information in the second embodiment. In this example, the content information 2300 is configured to include content IDs, content names, event 1, event 2, event 3, content file names, and thumbnail file names. Here, event 1 includes metadata of the highest hierarchy level 2201 shown in FIG. 22, event 2 includes metadata of the mid-hierarchy level 2202, and event 3 includes metadata of the lowest hierarchy level 2203.

For example, the content having a content ID "2210" has "photo 2210" as its content name, "school" as its metadata in the highest hierarchy level, "junior high school" as its metadata in the mid-hierarchy level, and "seventh-grade field trip" as its metadata in the lowest hierarchy level. Furthermore, the substantial content file has a content file name of "contents/photo 2210.jpg", and a thumbnail file name of "thum/photo 2210_thum.jpg".

The content information 2300 in the second embodiment illustrates example, and the configuration, names, and values are not limited thereto.

Also, although the content information 2300 includes metadata for each hierarchy level of the events in the example illustrated, metadata may be provided only for the lowest hierarchy level, and for the higher hierarchy level, other information representing a hierarchical structure may be referred to.

Figure 24:
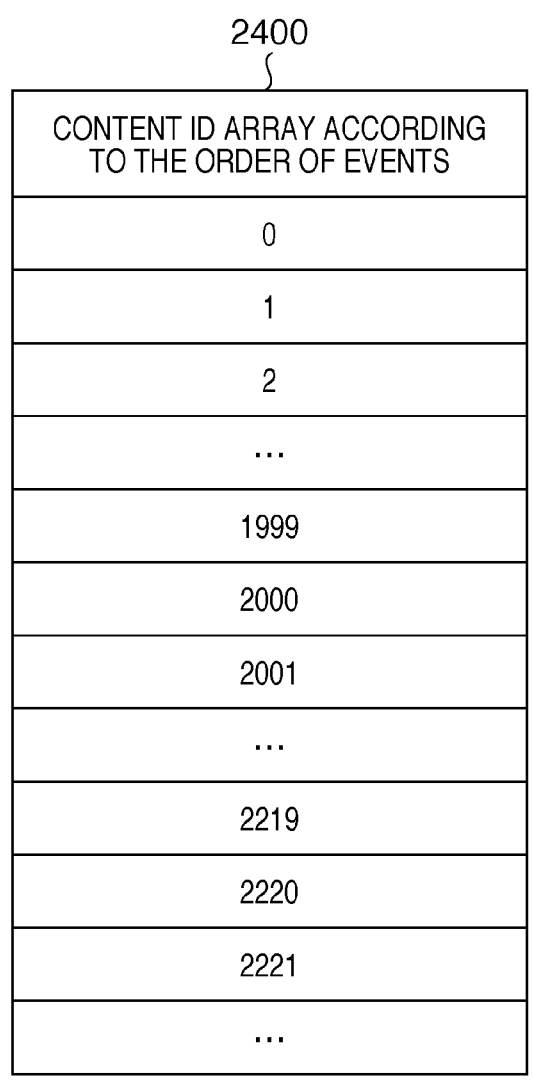
FIG. 24 is a diagram illustrating an example of a content ID array according to the order of events in the second embodiment.

FIG. 24 is a diagram illustrating an example of a content ID array according to the order of events in the second embodiment. In an example shown in FIG. 24, the content ID array 2400 is made based on the metadata hierarchy 2200 of events, with the content IDs "0, 1, 2, ..., 1999, 2000, 2001, ..., 2219, 2220, 2221, ..." in order.

Note that the content ID array 2400 in the second embodiment is an illustration of an example, and although the order is the same as the order of the content IDs, the present invention is not limited thereto.

Figure 25:
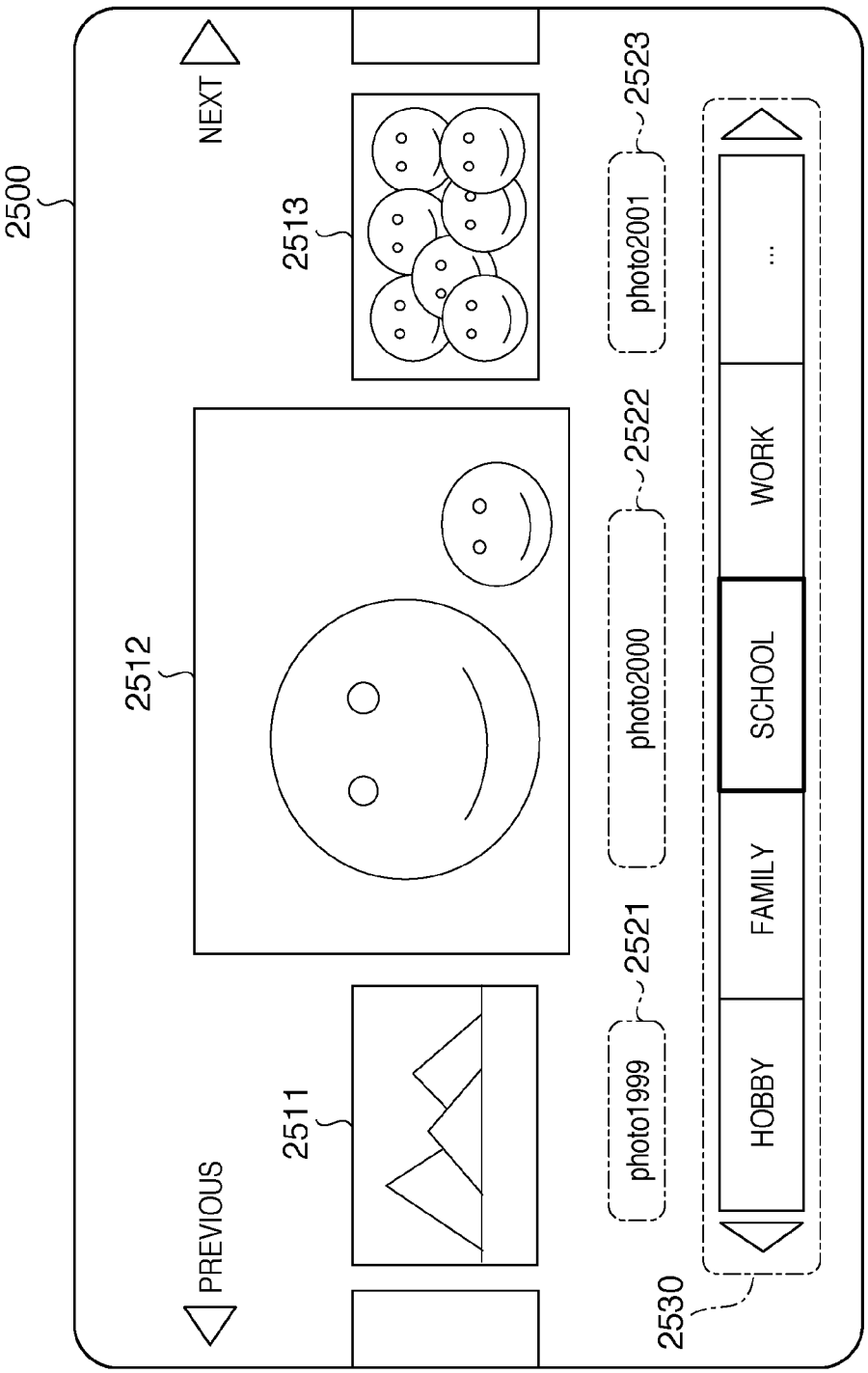
FIG. 25 is a diagram illustrating an example of a user interface screen at the time of high-speed scroll in the second embodiment.

FIG. 25 is a diagram illustrating an example of a user interface screen at the time of high-speed scroll in the second embodiment. As shown in FIG. 25, in this user interface screen 2500, content thumbnails 2511, 2512, and 2513, metadata 2521, 2522, and 2523, and the indicator 2530 are disposed based on the content ID array 2400.

The thumbnail 2512, the content in center represented by the metadata 2522, is a content being selected, called "selected content".

The indicator 2530 is disposed so that the metadata of the selected hierarchy level added to the selected content is positioned in center, and updated appropriately according to the scroll of contents, that is, the change of the selected content.

The example shown in FIG. 25 is a display at the time of high-speed scroll, and therefore in the indicator 2530, the metadata in the highest hierarchy level 2201 in FIG. 22, i.e., "school" added to the content name "photo 2000" as shown in FIG. 23, is disposed at its center.

Note that the user interface screen 2500 as shown in FIG. 25 is an example, and the scroll direction and array in the screen are not limited thereto.

Figure 26:
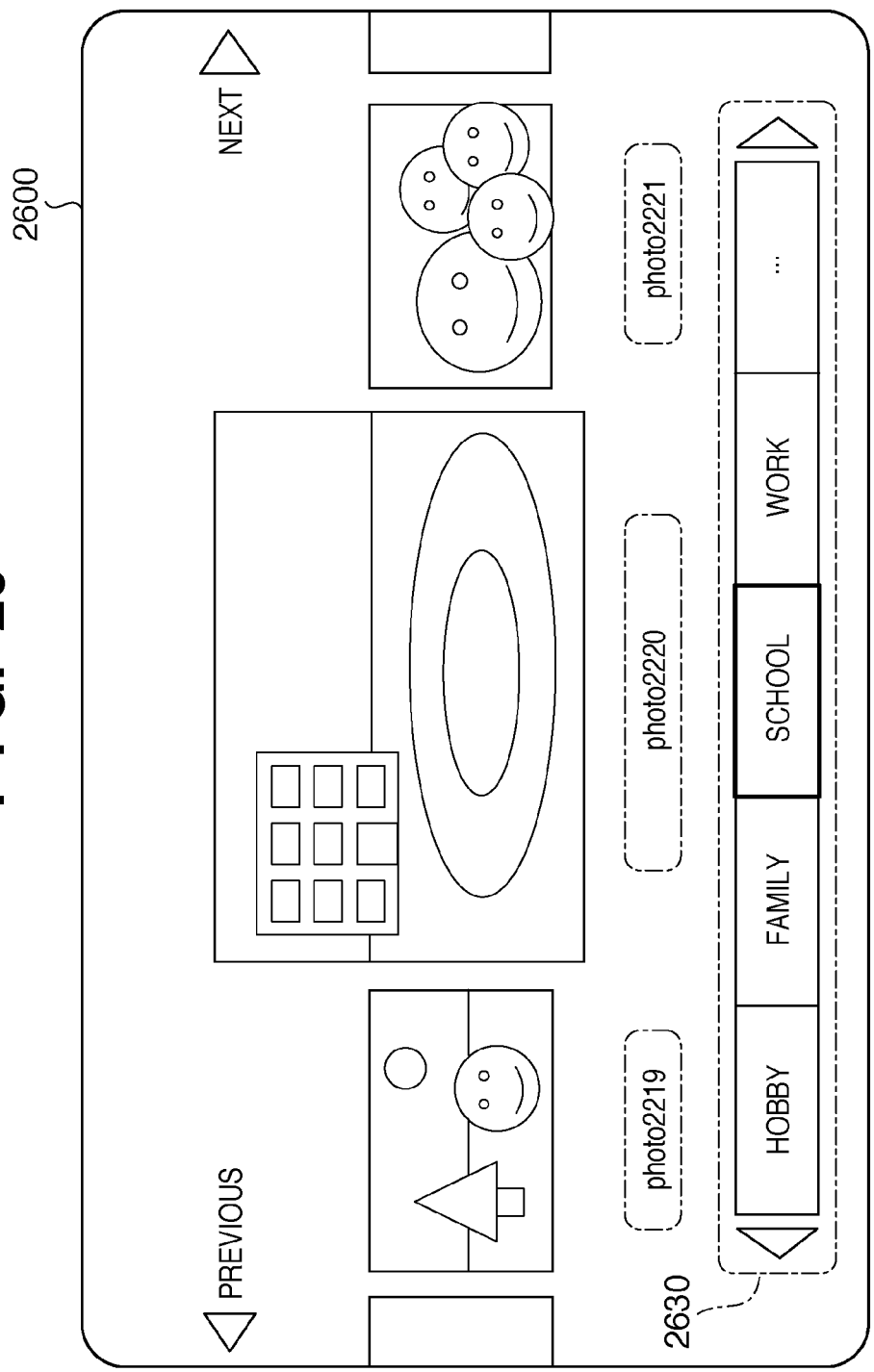
FIG. 26 is a diagram illustrating an example of a user interface screen at the time of low-speed scroll in the second embodiment.

FIG. 26 is a diagram illustrating an example of a user interface screen during low-speed scroll in the second embodiment. As shown in FIG. 26, the configuration of this user interface screen is the same as the user interface screen shown in FIG. 25, and therefore its description is omitted.

The example shown in FIG. 26 illustrates a display at the time of low-speed scroll. Thus, in an indicator 2630, the metadata in the lowest hierarchy level 2203 in FIG. 22, i.e., "seventh-grade sports day" added to the content name "photo 2220" as shown in FIG. 23, is disposed at the center.

Note that the user interface screen 2600 shown in FIG. 26 is an example, and the scroll direction and array in the screen are not limited thereto.

Figure 27:
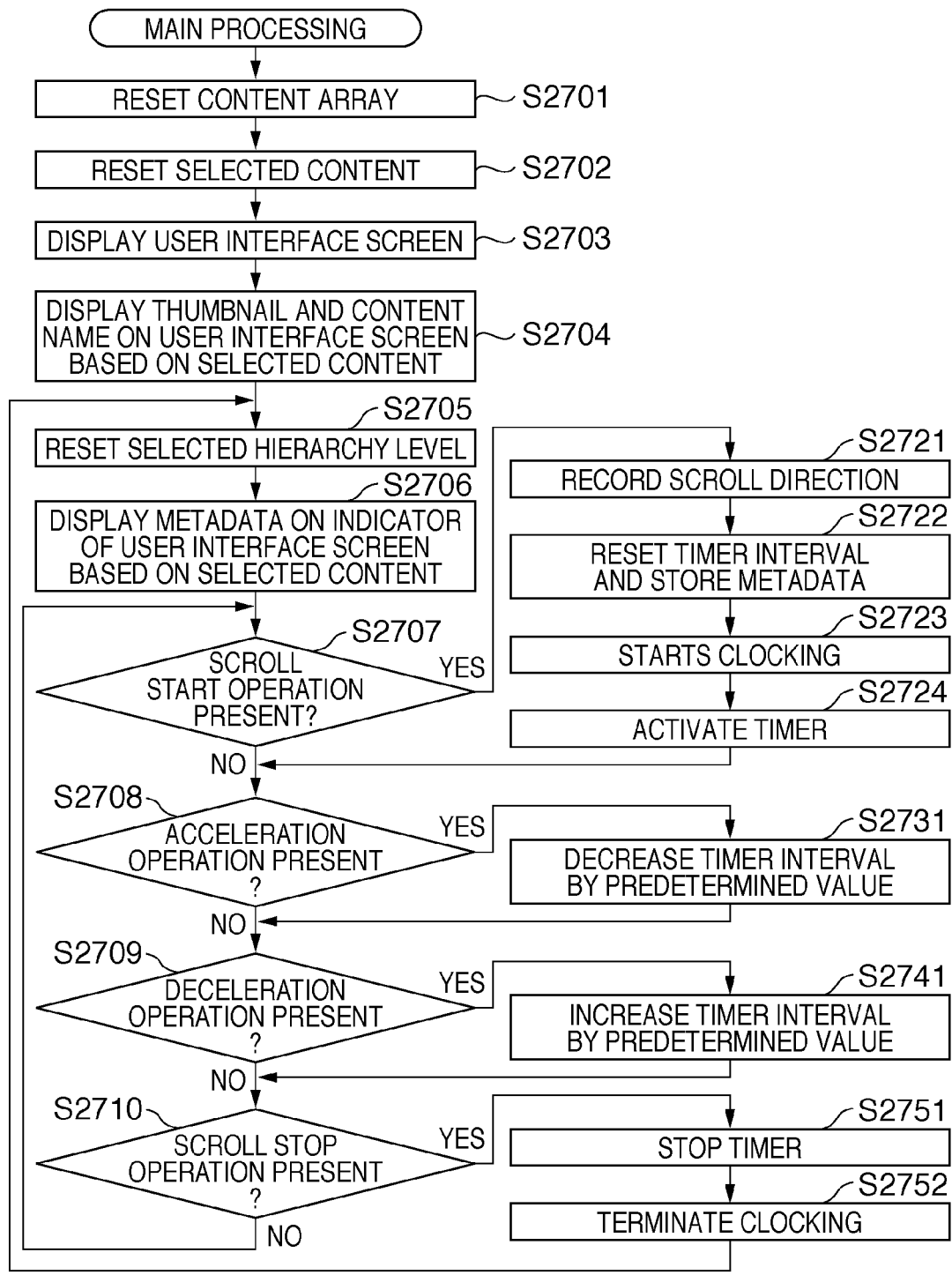
FIG. 27 is a flowchart illustrating main processing of the data browsing device in the second embodiment.
Figure 28:
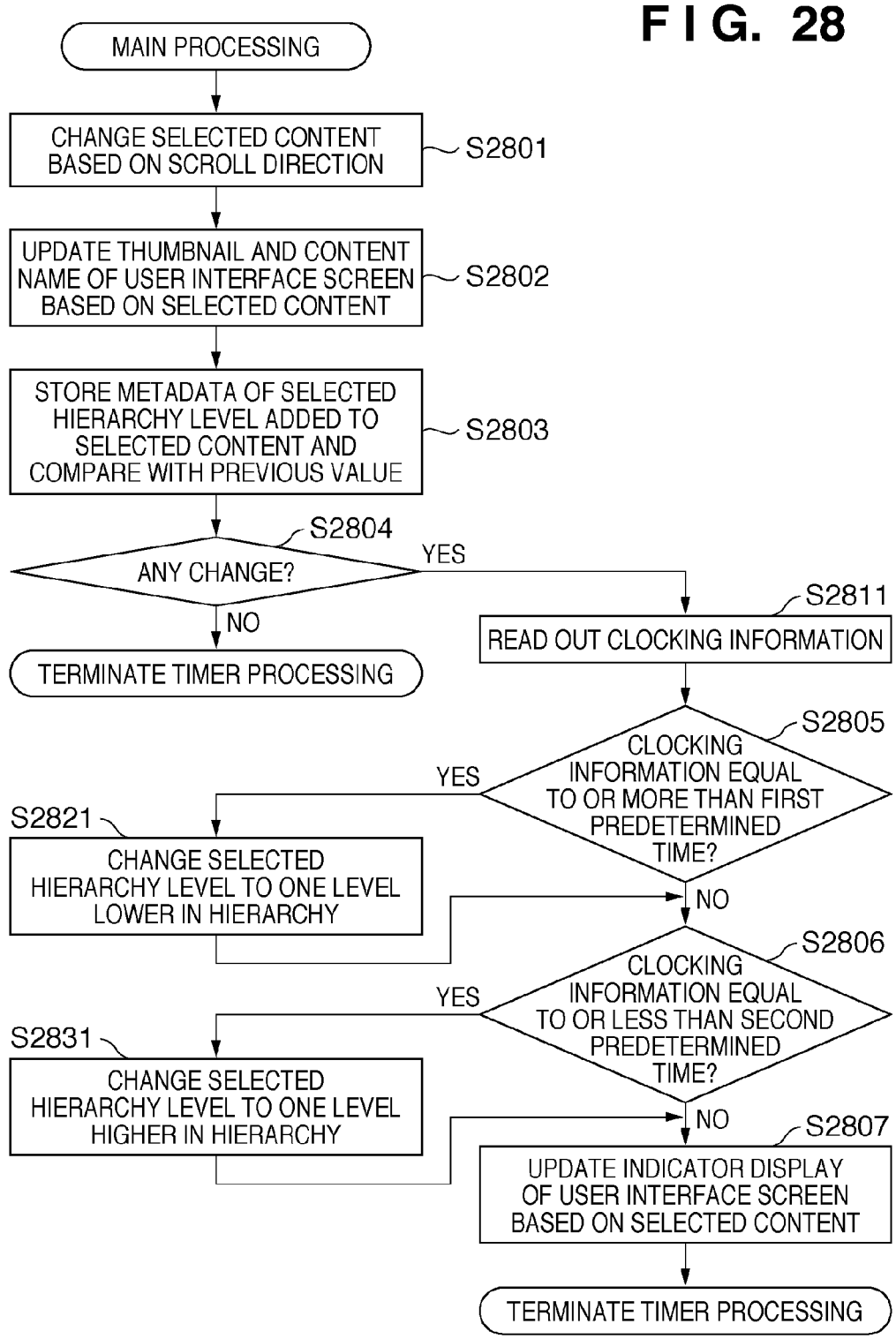
FIG. 28 is a flowchart illustrating timer processing in the second embodiment.

Next, with reference to FIG. 27 and FIG. 28, the processing carried out in the data browsing device 1900 when a user scrolls the user interface screen by using the infrared remote controller 1920 to browse desired contents is described. Note that this processing is carried out by the CPU 1901 of the data browsing device 1900 in accordance with a processing program stored in the HDD 1906.

FIG. 27 is a flowchart illustrating main processing of the data browsing device in the second embodiment. When the main processing starts, the content ID array 2400 to be displayed on the user interface screen (screen 2600 during low-speed scroll in the initial setting) is made (S2701) based on the content information 2300 and the metadata hierarchy 2200. Then, a preset content or a selected content selected by a user on the previous user interface screen is set to the top in the content ID array 2400 (S2702).

Then, the user interface screen 2600 is displayed (S2703); and the thumbnails and the content names are read out based on the selected content and the content ID array 2400 and displayed on the user interface screen 2600 (S2704). Then, the selected hierarchy level is set to the lowest hierarchy level 2203 (S2705), and the metadata is displayed in the indicator 2630 of the user interface screen 2600 (S2706) based on the selected hierarchy level and the selected content.

Then, the following are checked: presence or absence of a scroll start operation by the infrared remote controller 1920 (S2707); presence or absence of an acceleration operation (S2708); presence or absence of a deceleration operation (S2709); and presence or absence of a scroll stop operation (S2710). As a result of the check, if there is a scroll start operation by the right button 2101 or the left button 2102 (YES in S2707), the designated scroll direction is recorded (S2721). Furthermore, a timer interval of scroll display is reset, and metadata of the selected hierarchy level added to the selected content is stored (S2722).

Then, the scroll speed detection unit 2004 starts clocking for the scroll speed detection (S2723), and activates timer processing for updating the scroll display and indicator display (S2724). Details of this timer processing are described later with reference to FIG. 28.

Furthermore, when there is an acceleration operation for the scroll speed by the acceleration button 2103 (YES in S2708), the timer interval is decreased by a predetermined value to shorten the interval for carrying out the timer processing (S2731). However, when there is a deceleration operation for the scroll speed by the deceleration button 2104 (YES in S2709), the timer interval is increased by a predetermined value to extend the interval for carrying out the timer processing (S2741).

At this point, when there is a scroll stop operation by the stop button 2105 (YES in S2710), the timer processing is terminated (S2751), and the clocking for the scroll speed detection is stopped (S2752). Then, the selected hierarchy level is reset (S2705), and the above-described processing by the infrared remote controller 1920 is repeated.

FIG. 28 is a flowchart illustrating timer processing in the second embodiment. This timer processing is processing that starts with a predetermined timer interval.

When the timer processing starts, the selected content is changed based on the scroll direction and the content ID array 2400 (S2801). Then, the user interface screen is updated by the thumbnail and the content name of the changed selected content (S2802).

Then, the metadata of the selected hierarchy level added to the selected content is stored and compared with the previous value (S2803). If the results of the comparison do not indicate a change (NO in S2804), the timer processing is terminated.

On the other hand, when there is a change (YES in S2804), clocking information, i.e., a change interval of metadata of the selected hierarchy level at the current scroll speed, is read out (S2811). Then, the following are checked: if the clocking information is equal to or more than a first predetermined value (S2805); and if the clocking information is equal to or less than a second predetermined value (S2806). At this point, if it is equal to or more than the first predetermined value (YES in S2805), the selected hierarchy level is changed to one level lower in the hierarchy (S2821). However, if the value is equal to or less than the second predetermined value (YES in S2806), the selected hierarchy level is changed to one level higher in the hierarchy (S2831).

Then, based on the selected hierarchy level, the indicator of the user interface screen is updated (S2807), and the timer processing is terminated.

When the time interval of the metadata change varies and exceeds the range of the first predetermined time and the second predetermined time, an average of a plurality of sets of metadata change may be calculated, and a more stable indicator display can be achieved.

According to the second embodiment, by displaying the metadata of the hierarchy which changes in a certain time range in the indicator according to the scroll speed, operability is improved in that a user can control the scroll while grasping the position of a desired content by metadata.

[Variation 1]

In the following, Variation 1 of the second embodiment is described in detail with reference to the figures. Note that the hardware configuration, the functional configuration, and the infrared remote controller in Variation 1 are the same as those of the second embodiment described by using FIG. 19 to FIG. 21.

Also, the metadata hierarchical structure, the content information, and the content array are the same as those of the second embodiment described using FIG. 22 to FIG. 24.

Furthermore, the user interface screen is the same as that of the second embodiment described using FIG. 25 and FIG. 26.

In the following, the main processing of Variation 1 of the second embodiment is described with reference to FIG. 29 and FIG. 30.

Figure 29:
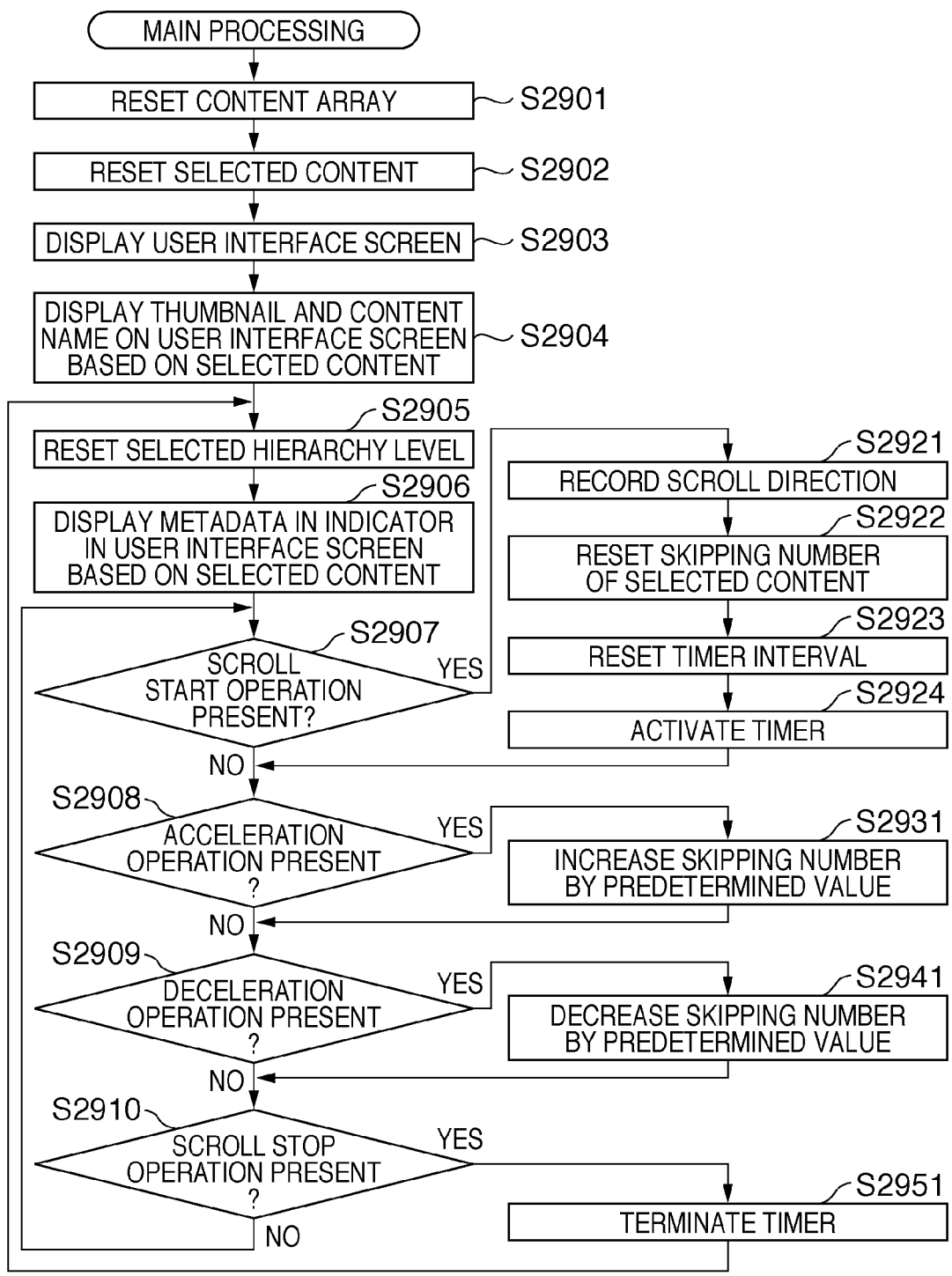
FIG. 29 is a flowchart illustrating main processing of a data browsing device in Variation 1.

FIG. 29 is a flowchart illustrating main processing of a data browsing device in Variation 1. The processing from S2901 to S2906 in FIG. 29 is the same as the processing from S2701 to S2706 in FIG. 27 in the second embodiment. Described in the following are: processing after S2907, i.e., processing in the case where the scroll operation is present as a result of checking presence or absence of the scroll operation by the infrared remote controller 1920; and timer processing.

Next, the presence or absence of a scroll start operation (S2907), presence or absence of an acceleration operation (S2908), presence or absence of a deceleration operation (S2909), and presence or absence of a scroll stop operation (S2910) by the infrared remote controller 1920 are checked. If the results of the checking show that the scroll start operation by the right button 2101 or the left button 2102 is present (YES in S2907), the scroll direction is recorded (S2921), and a skipping number of the selected content is reset to "1" (S2922).

Then, a timer interval of the scroll display is reset (S2923), and timer processing for updating the scroll display and the indicator display is activated (S2924). Details of this timer processing is described later by using FIG. 30.

If the acceleration operation of the scroll speed by the acceleration button 2103 is present (YES in S2908), the skipping number is increased by a predetermined value (S2931). However, when there is the deceleration operation of the scroll speed using the deceleration button 2104 (YES in S2909), the skipping number is decreased by a predetermined value (S2941).

At this point, when there is the scroll stop operation by the stop button 2105 (YES in S2910), the timer processing is terminated (S2951), and the above-described processing by the infrared remote controller 1920 is repeated.

Figure 30:
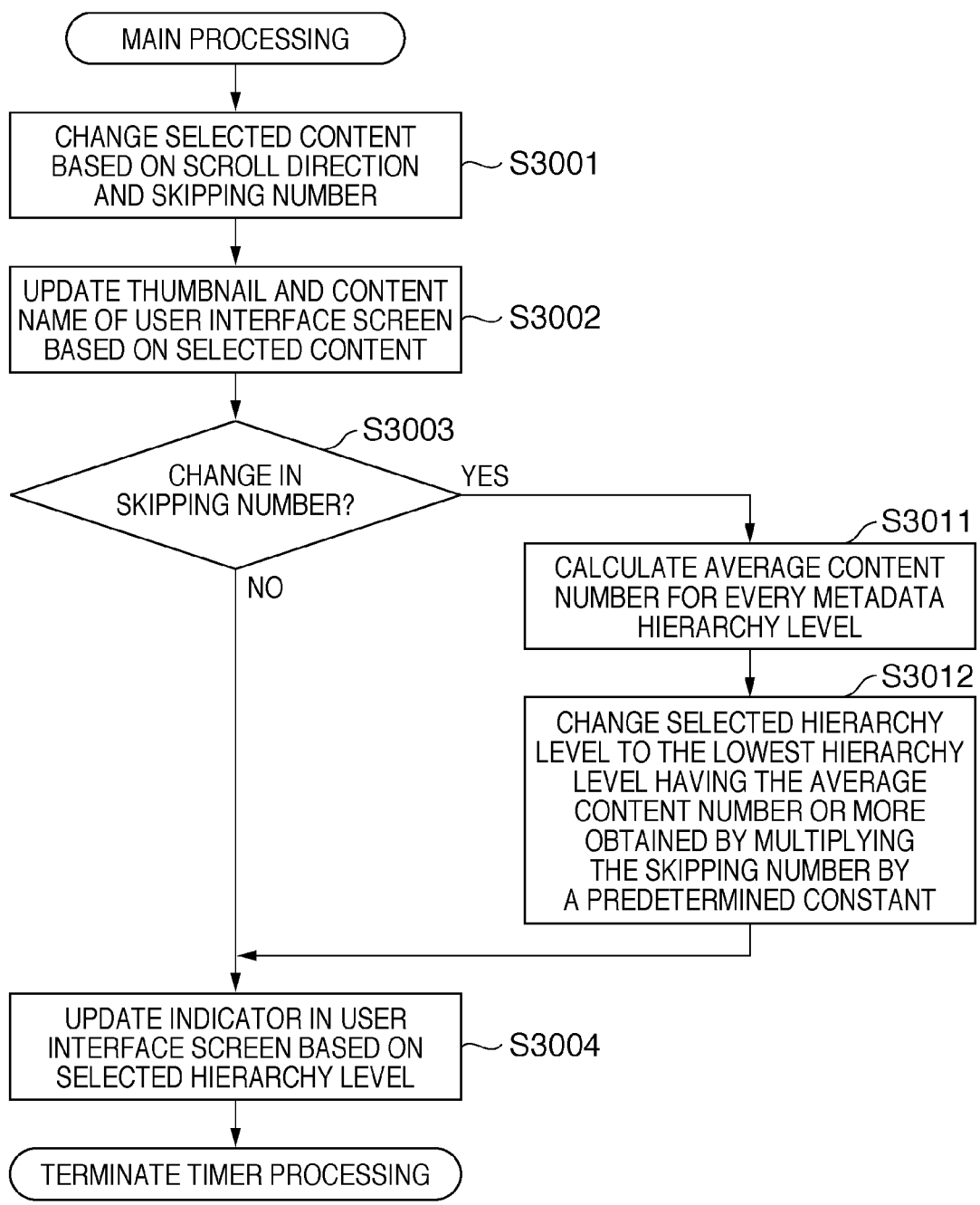
FIG. 30 is a flowchart illustrating timer processing in variation 1.

FIG. 30 is a flowchart illustrating timer processing in Variation 1. This timer processing starts with the timer interval reset in S2923.

When the timer processing starts, the selected content is changed (S3001) based on the scroll direction, the skipping number, and the content ID array 2400. Then, the user interface screen is updated with the thumbnail and the content name of the changed selected content (S3002). When the selected content is "photo 2210" and the skipping number is "10", since the order in the content ID array 2400 and the order of the contents are the same, "photo 2220" is selected as the next content. The user interface screen also shows thumbnails of contents previous and next to the selected content.

Next, the presence or absence of changes in the skipping number is checked (S3003), and when there is a change (YES in S3003), an average value of the number of the contents to which the metadata is added is calculated for each metadata hierarchy 2200 (S3011). The calculation of the number of contents can be calculated once and reused, as long as there is no increase or decrease in the contents or change in the metadata.

Then, the selected hierarchy level is changed to a level having a number greater than or equal to the number obtained by multiplying the skipping number by a preset constant and being the lowest hierarchy level (S3012); the indicator display is updated based on the selected hierarchy level changed (S3004); and this timer processing is terminated.

When there is no change in the skipping number (NO in S3003), with no change in the selected hierarchy level, the indicator display is updated (S3004), and this timer processing is terminated.

According to Variation 1, operability is improved in that a user can control the scroll while grasping the position of the desired content by metadata when scrolling is carried out, since gradually changing added information in the hierarchy level having data of equal to or more than the scroll skipping number is scroll-displayed in the indicator.

Furthermore, the processing load is reduced compared with the second embodiment because the clocking for the scroll speed detection is unnecessary.

[Variation 2]

In the following, Variation 2 of the second embodiment is described in detail with reference to the figures. Note that the hardware configuration, the functional configuration, and the infrared remote controller in Variation 2 are the same as those in the second embodiment described by using FIG. 19 to FIG. 21.

Also, the metadata hierarchical structure, the content information, and the content array are the same as those described by using FIG. 22 to FIG. 24 in the second embodiment.

Furthermore, the user interface screen is the same as that described in the second embodiment by using FIG. 25 and FIG. 26.

In the following, main processing of Variation 2 of the second embodiment is described with reference to FIG. 31 and FIG. 32. Note that in Variation 2, the selected hierarchy level is changed using a skipping hierarchy level, instead of the skipping number used in Variation 1.

Figure 31:
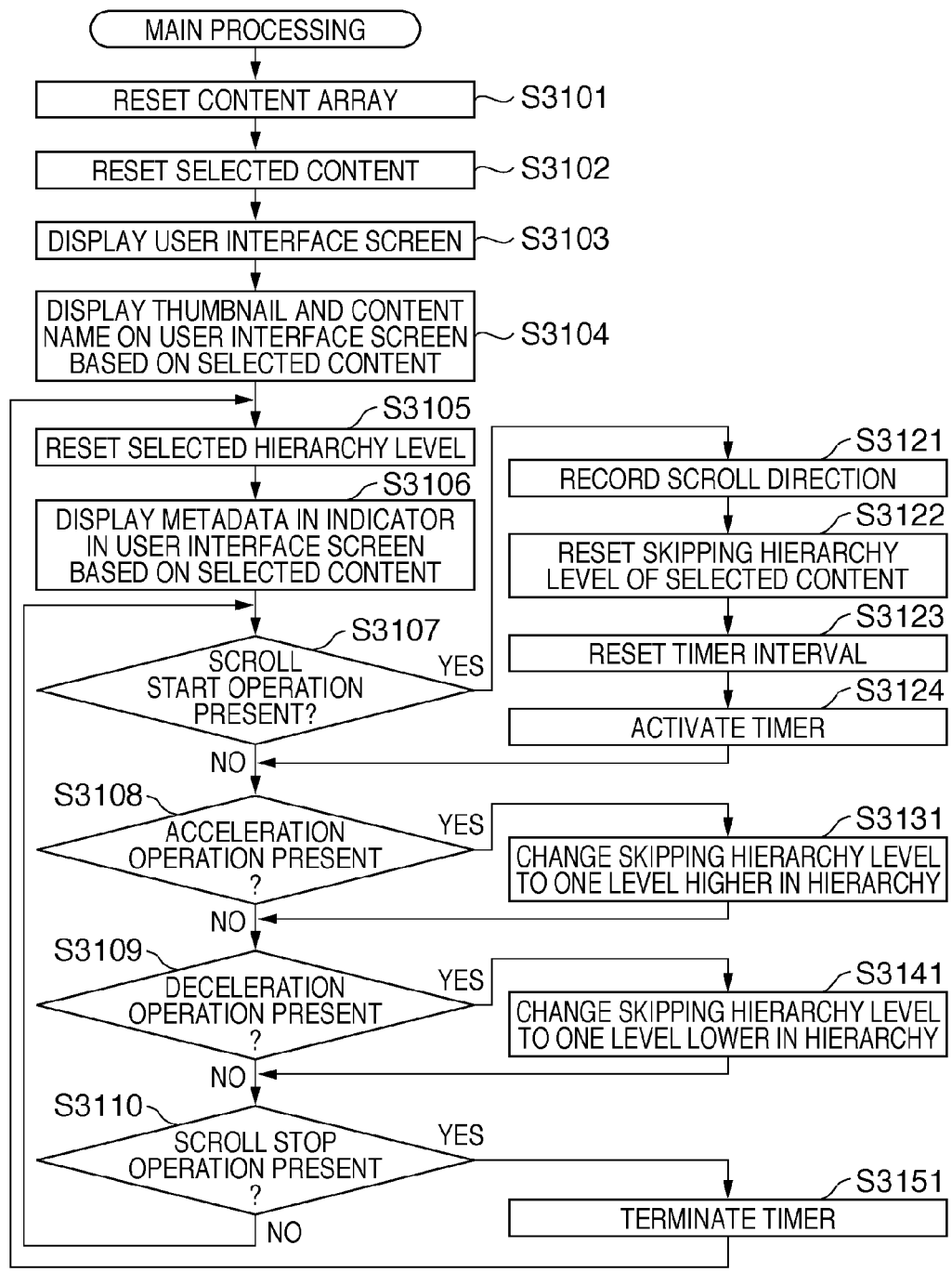
FIG. 31 is a flowchart illustrating main processing of a data browsing device in Variation 2.

FIG. 31 is a flowchart illustrating main processing of a data browsing device in Variation 2. The processing in S3101 to S3110, S3121, S3123, S3124, and S3151 in FIG. 31 is the same as that in S2901 to S2910, S2921, S2923, S2924, and S3151 in Variation 1.

Similarly to the processing in Variation 1, when there is a scroll start operation by the right button 2101 or the left button 2102 (YES in S3107), the scroll direction is recorded (S3121), and the skipping hierarchy level of the selected content is reset to "none" (S3122). Note that the skipping hierarchy level "none" is subordinate to the lowest level of hierarchy 2203. In the following processing, similarly to Variation 1, the timer interval is reset (S3123), and the timer processing is activated (S3124).

When there is the acceleration operation of the scroll speed by the acceleration button 2103 (YES in S3108), the skipping hierarchy level is set to one level higher in the hierarchy (S3131). That is, if the skipping hierarchy level is "none", it is changed to the lowest level of hierarchy 2203, i.e., one level higher in the hierarchy.

Also, when there is the deceleration operation of the scroll by the deceleration button 2104 (YES in S3109), the skipping hierarchy level is changed to one level lower in the hierarchy (S3141).

Figure 32:
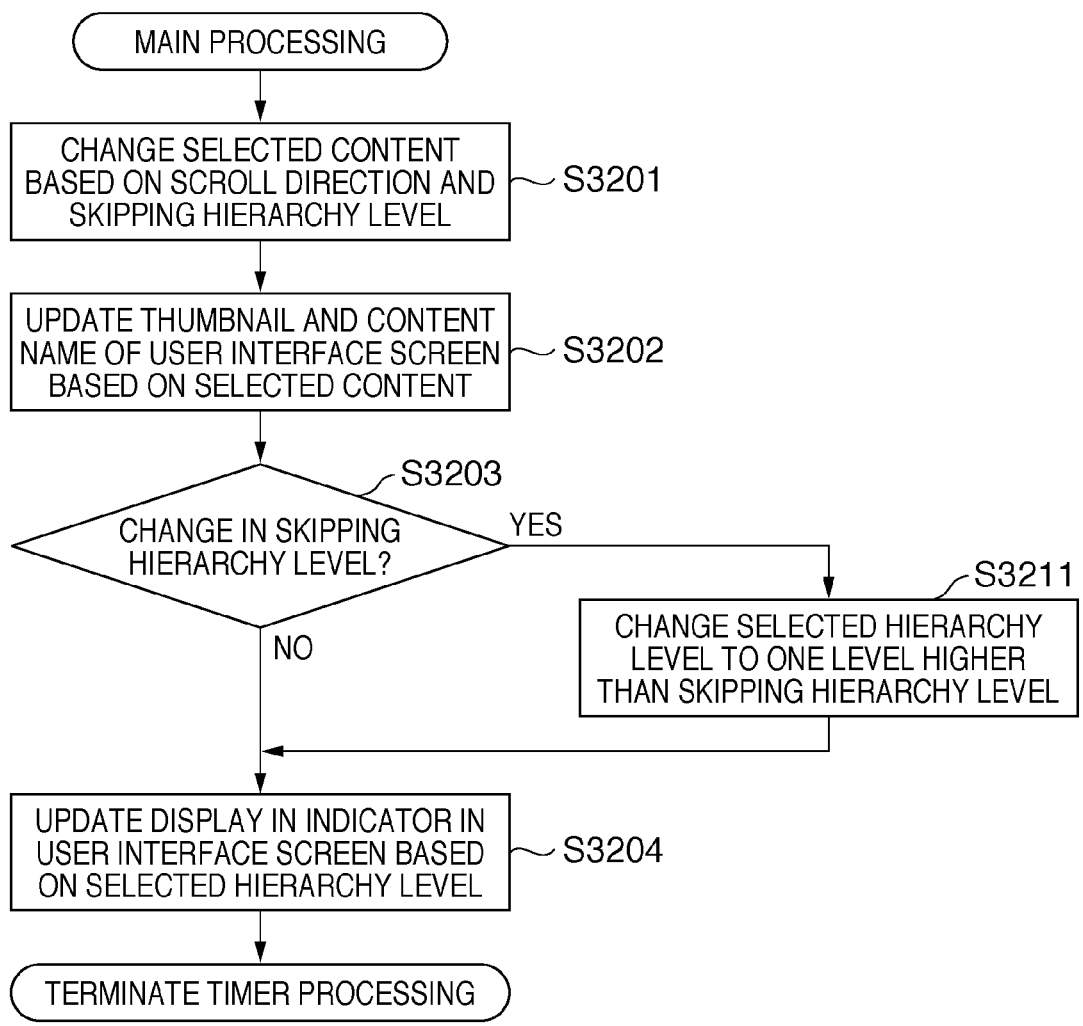
FIG. 32 is a flowchart illustrating timer processing in Variation 2.

FIG. 32 is a flowchart illustrating timer processing in Variation 2. When the timer processing starts, similarly to S3001 and S3002 in Variation 1, processing in S3201 and S3202 is carried out.

Next, a determination is made as to whether or not there is a change in the skipping hierarchy level (S3203), and there is no change (NO in S3203), similarly to S3004 in Variation 1, processing in S3204 is carried out. On the other hand, when there is a change (YES in S3203), the selected hierarchy level is changed to one level lower or one level higher in the hierarchy than the skipping hierarchy level (S3211). For example, when the acceleration operation is carried out with the skipping hierarchy level in the lowest hierarchy level 2203 (FIG. 26), it is changed to a mid-hierarchy level 2202, i.e., one level higher. Then, top contents "photo 2000", "photo 2100", and "photo 2200" with added metadata of "kindergarten", "elementary school", and "junior high school" in the mid-hierarchy level 2202 are displayed. Furthermore, in the indicator, "school", and "work" in one level even higher in the hierarchy are displayed.

According to Variation 2, operability is improved in that a user can control the scroll while grasping the position of desired contents by metadata, since the indicator displays added information of one level higher in the hierarchy when scrolled according to the skipping hierarchy level.

Furthermore, since the clocking for the scroll speed detection is unnecessary, and calculation of the average content number for each hierarchy level is unnecessary compared with Variation 1, the processing load is reduced.

According to the second embodiment, when a scroll is carried out in a data browsing device, the indicator can display added information of the levels in the hierarchy which changes gradually according to the scroll speed. Therefore, operability is improved in that a user can control the scroll speed while grasping the position of a desired content.

Note that the present invention may be applied in a system configured of a plurality of devices (for example, a host computer, an interface device, a reader, a printer, and so on), or may be applied in an apparatus configured of a single device (for example, a copy machine, a facsimile device, and so on).

Furthermore, it goes without saying that the object of the present invention can also be achieved by supplying, to a system or apparatus, a storage medium in which the program code for software that realizes the functions of the aforementioned embodiments has been stored. In such a case, the above functions are implemented by a computer (or CPU or MPU) of the system or apparatus reading out and executing the program code stored in the storage medium.

Note that in such a case, the present invention is configured of the storage medium in which the program code is stored.

A flexible disk, a hard disk, an optical disk, a magneto-optical disk, a CD-ROM, a CD-R, magnetic tape, a non-volatile memory card, a ROM, and the like are examples of storage media that can be used to supply the program code.

However, the invention is not intended to be limited to the case where the functions of the aforementioned embodiments are implemented by a computer executing the read-out program code. That is, it goes without saying that the case where, for example, an operating system (OS) or the like running in a computer performs part or all of the actual processing based on instructions in the program code, and the functions of the aforementioned embodiments are realized by that processing, is included in the scope of the present invention.

Furthermore, the case where the functions of the aforementioned embodiments are implemented after the program code read out from the storage medium has been written into a memory provided in a function expansion board installed in the computer is also included within the scope of the present invention. In other words, the case where, after the program code has been written into a memory, a CPU or the like included in the expansion board performs all or part of the actual processing based on instructions included in the program code, and the functions of the aforementioned embodiment are implemented through that processing, also falls within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-233376, filed Sep. 7, 2007, which is hereby incorporated by reference herein in its entirety.

What is claimed is:

1. A content display apparatus that displays a plurality of contents according to an order of metadata added to each of the plurality of contents, the apparatus comprising a processor programmed to at least:
   arrange a plurality of contents hierarchically by metadata and groups of the metadata, and form an array of the plurality of contents arranged hierarchically;
   control a display of icons representing the contents or icons representing groups on a display device according to an order of the array of the plurality of contents formed;
   control a scroll speed when scrolling and displaying icons in a hierarchy level in which the icons belong in accordance with a scroll command mode for the displayed icons;
   control a change in the scroll speed;
   calculate an average content number, which is an average value of a number of contents to which the metadata is added, for each hierarchy level; and
   switch the hierarchy level to a different hierarchy level so as to scroll and display icons of the different hierarchy level based on the changed scroll speed and the calculated average content number.

2. The apparatus according to claim 1, wherein the icons representing the contents are at least one of a content itself, a reduced image of the content, and an image that can be recognized as the content.

3. The apparatus according to claim 1, wherein the icons representing the groups is at least one of a representative content in a group, an image displaying one or a plurality of contents in the group, and an image that can be recognized as the group.

4. The apparatus according to claim 1, wherein the scroll speed is based on a skipping number of the scrolled icons, and the hierarchy level is changed to a lowest hierarchy level having an average content number equal to or more than a number obtained by multiplying the skipping number by a predetermined constant.

5. The apparatus according to claim 4, wherein the processor is programmed to display the icons by:
   setting one of an icon representing a content being displayed and a group icon representing a group as a base icon;
   causing the base icon to shift in a scroll direction every time a display is changed by scrolling; and when switching a hierarchy level being scrolled so as to display and scroll group icons in a higher hierarchy level, performing a switch so that the base icon at that time, a content represented by an icon disposed next to the base icon, or a group icon of a content group in a higher hierarchy level to which data of the group belongs, is displayed as the base icon.

6. The apparatus according to claim 1, wherein, when a command for stopping the scrolling is made, the displaying of the icons in the hierarchy level in which the scrolling was carried out is held for a predetermined period of time and is switched, after the predetermined time has elapsed, to a content represented by a base icon, a content in a lower hierarchy level belonging to a content group, or an icon of the content group, when the scrolling is stopped.

7. The apparatus according to claim 1, wherein, when a command for stopping the scrolling is made, icons are displayed sequentially for each level up to a lowest hierarchy level.

8. The apparatus according to claim 1, wherein the processor is programmed to select a hierarchy level of the metadata that is arranged hierarchically by group and display information representing the selected hierarchy level as an indicator.

9. A display method of a content display apparatus that displays a plurality of contents according to an order of metadata added to each of the plurality of contents, the method comprising steps of:
- forming an array of a plurality of contents, in which the plurality of contents are arranged hierarchically by metadata and groups of the metadata;
- displaying icons representing the contents or icons representing groups on a display device according to the order of the array of plurality of contents formed;
- controlling a scroll speed when scrolling and displaying icons in a hierarchy level in which the icons belong in accordance with a scroll command made for the displayed icons;
- changing the scroll speed;
- calculating an average content number, which is an average value of a number of contents to which the metadata is added, for each hierarchy level; and
- switching the hierarchy level so that icons in a different hierarchy level are displayed and scrolled based on the changed scroll speed and the calculated average content number.

* * * * *